United States Patent
Awad et al.

(10) Patent No.: US 10,667,255 B2
(45) Date of Patent: May 26, 2020

(54) COMMUNICATION SYSTEM

(71) Applicant: NEC Corporation, Tokyo (JP)

(72) Inventors: Yassin Aden Awad, Uxbridge (GB); Robert Arnott, London (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 174 days.

(21) Appl. No.: 15/748,296

(22) PCT Filed: Aug. 10, 2016

(86) PCT No.: PCT/JP2016/003709
§ 371 (c)(1),
(2) Date: Jan. 29, 2018

(87) PCT Pub. No.: WO2017/026126
PCT Pub. Date: Feb. 16, 2017

(65) Prior Publication Data
US 2018/0220404 A1    Aug. 2, 2018

(30) Foreign Application Priority Data

Aug. 12, 2015 (GB) .................................. 1514235.9

(51) Int. Cl.
*H04W 72/04* (2009.01)
*H04W 4/70* (2018.01)
*H04L 5/00* (2006.01)

(52) U.S. Cl.
CPC ......... *H04W 72/044* (2013.01); *H04L 5/0012* (2013.01); *H04L 5/0053* (2013.01);
(Continued)

(58) Field of Classification Search
CPC ... H04W 72/044; H04W 4/70; H04W 72/042; H04W 72/0453; H04W 72/04; H04L 5/0012; H04L 5/0053; H04L 5/0094
See application file for complete search history.

(56) References Cited

U.S. PATENT DOCUMENTS

2013/0294399 A1    11/2013  Lee et al.
2013/0322363 A1*   12/2013  Chen ................... H04W 72/042
                                                           370/329
(Continued)

FOREIGN PATENT DOCUMENTS

CN          104380820 A       2/2015
CN          104769857 A       7/2015
(Continued)

OTHER PUBLICATIONS

3GPP TR 36.888 V12.0.0, "3rd Generation Partnership Project; Technical Specification Group Radio Access Network; Study on provision of low-cost Machine-Type Communications (MTC) User Equipments (UEs) based on LTE (Release 12)", 2013-06, pp. 1-55.

(Continued)

*Primary Examiner* — Jeffrey M Rutkowski
*Assistant Examiner* — Chae S Lee
(74) *Attorney, Agent, or Firm* — Sughrue Mion, PLLC

(57) ABSTRACT

A communication system is disclosed in which a base station communicates with a reduced bandwidth machine-type-communication (MTC) device by dividing the base station's cell bandwidth into non-overlapping band portions, each band portion comprising a respective set of contiguous resource blocks that occupy a frequency bandwidth not exceeding the bandwidth of the MTC device, and each band portion having a respective index for identifying that band portion. The base station obtains: i) an index of a band portion for use by the MTC device; and ii) information for identifying an allocation of at least one resource block within that band portion. The base station generates and signals, to the MTC device, control data for uniquely identifying a position of the allocation of at least one resource block, within said cell bandwidth.

18 Claims, 7 Drawing Sheets

(52) U.S. Cl.
CPC .............. *H04L 5/0094* (2013.01); *H04W 4/70* (2018.02); *H04W 72/042* (2013.01); *H04W 72/0453* (2013.01)

(56) References Cited

U.S. PATENT DOCUMENTS

| | | | | |
|---|---|---|---|---|
| 2014/0192756 | A1* | 7/2014 | Baldemair | H04L 5/001 370/329 |
| 2015/0264693 | A1* | 9/2015 | Zhu | H04W 72/0493 370/329 |
| 2015/0282208 | A1 | 10/2015 | Yi et al. | |
| 2016/0242207 | A1 | 8/2016 | Yasukawa et al. | |
| 2017/0303241 | A1* | 10/2017 | Yang | H04W 72/04 |
| 2018/0176753 | A1* | 6/2018 | Kim | H04W 72/04 |

FOREIGN PATENT DOCUMENTS

| | | |
|---|---|---|
| WO | 2013/020565 A1 | 2/2013 |
| WO | 2015/045865 A1 | 4/2015 |
| WO | 2015/138446 A1 | 9/2015 |

OTHER PUBLICATIONS

Ericsson, "Revised WI: Further LTE Physical Layer Enhancements for MTC", 3GPP work item document RP-150492, 3GPP TSG RAN Meeting #67, Mar. 9-12, 2015, pp. 1-8, Shanghai, China.
3GPP TS 22.368 V12.4.0, "3rd Generation Partnership Project; Technical Specification Group Services and System Aspects; Service requirements for Machine-Type Communications (MTC); Stage 1 (Release 12)", 2014-06, pp. 1-23.
3GPP TS 22.368 V13.1.0, "3rd Generation Partnership Project; Technical Specification Group Services and System Aspects; Service requirements for Machine-Type Communications (MTC); Stage 1 (Release 13)", 2014-12, pp. 1-26.
3GPP TS 36.213 V12.6.0, "3rd Generation Partnership Project; Technical Specification Group Radio Access Network; Evolved Universal Terrestrial Radio Access (E-UTRA); Physical layer procedures (Release 12)", 2015-06, pp. 1-241.
NTT DOCOMO et al, "Way forward on Resource Allocation for PDSCH/PUSCH", 3GPP DRAFT R1-153619, 3GPP TSG RAN WG1 Meeting #81, pp. 1-5, May 20-29, 2015, Fukuoka, Japan.
LG Electronics et al., "WF on Narrowband Definition for Rel-13 MTC UEs", 3GPP DRAFT R1-153615, 3GPP TSG RAN WG1 #81, May 25-29, 2015, pp. 1-3, Fukuoka, Japan.
CATT, "Narrowband design for Rel-13 low complexity UEs", 3GPP DRAFT R1-152556, 3GPP TSG RAN WG1 Meeting #81, May 25-29, 2015, pp. 1-2, Fukuoka, Japan.
NEC, "Details of the Frequency hopping schemes for LTE Rel-13 MTC", 3GPP DRAFT R1-154196, 3GPP TSG RAN WG1 Meeting #82, Aug. 24-28, 2015, pp. 1-6, Beijing, China.
NEC, "Definition of Narrowbands across System BW for LTE Rel-13", 3GPP DRAFT R1-154195, 3GPP TSG RAN WG1 Meeting #82, Aug. 24-28, 2015, pp. 1-6, Beijing, China.
MCC Support, "Draft Report of 3GPP TSG RAN WG1 #81 v0.1.0", 3GPP DRAFT, 3GPP TSG RAN WG1 Meeting #82, Aug. 24-28, 2015, pp. 1-93, Beijing, China.
International Search Report of PCT/JP2016/003709 dated Nov. 17, 2016 [PCT/ISA/210].
Written Opinion of PCT/JP2016/003709 dated Nov. 17, 2016 [PCT/ISA/237].
ZTE, "PRB group definition and frequency hopping for MTC enhancement", 3GPP TSG-RAN WG1#81 R1-152954, May 25-29, 2015, Internet<URL:http://www.3gpp.org/ftp/tsg_ran/WG1_RL1/TSGR1_81/Docs/R1-152954.zip>, 6 pages total.
MediaTek Inc.,"MTC narrow-band discussion and resource allocation Design", 3GPP TSG-RAN WG1#81 R1-153335, May 25-29, 2015, Internet<URL:http://www.3gpp.org/ftp/tsg_ran/WG1_RL1/TSGR1_81/Docs/R1-153335.zip>, 3 pages total.
NEC, "Details of the DL Frequency hopping scheme for LTE Rel-13 MTC", 3 GPP TSG-RAN WG1#81 R1-152674, May 25-29, 2015, Internet<URL:http://www.3gpp.org/ftp/tsg_ran/WG1_RL1/TSGR1_81/Docs/R1-152674.zip>, 3 pages total.
Notification of Reasons for Refusal dated Mar. 26, 2019 issued by the Japanese Patent Office in counterpart application No. 2018-506627.
Communication dated Nov. 20, 2019 by the China National Intellectual Property Administration in application No. 201680047178.9.

* cited by examiner

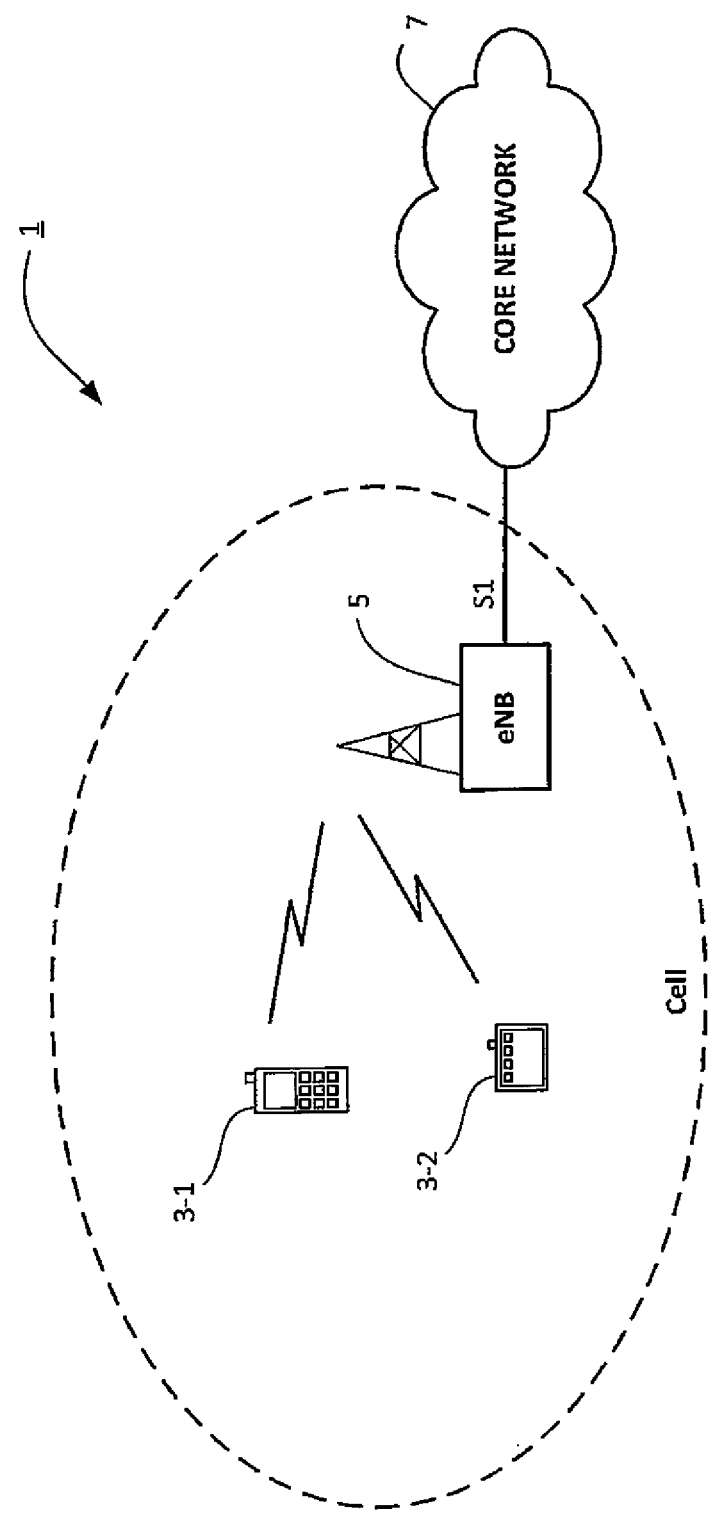
[Fig. 1]

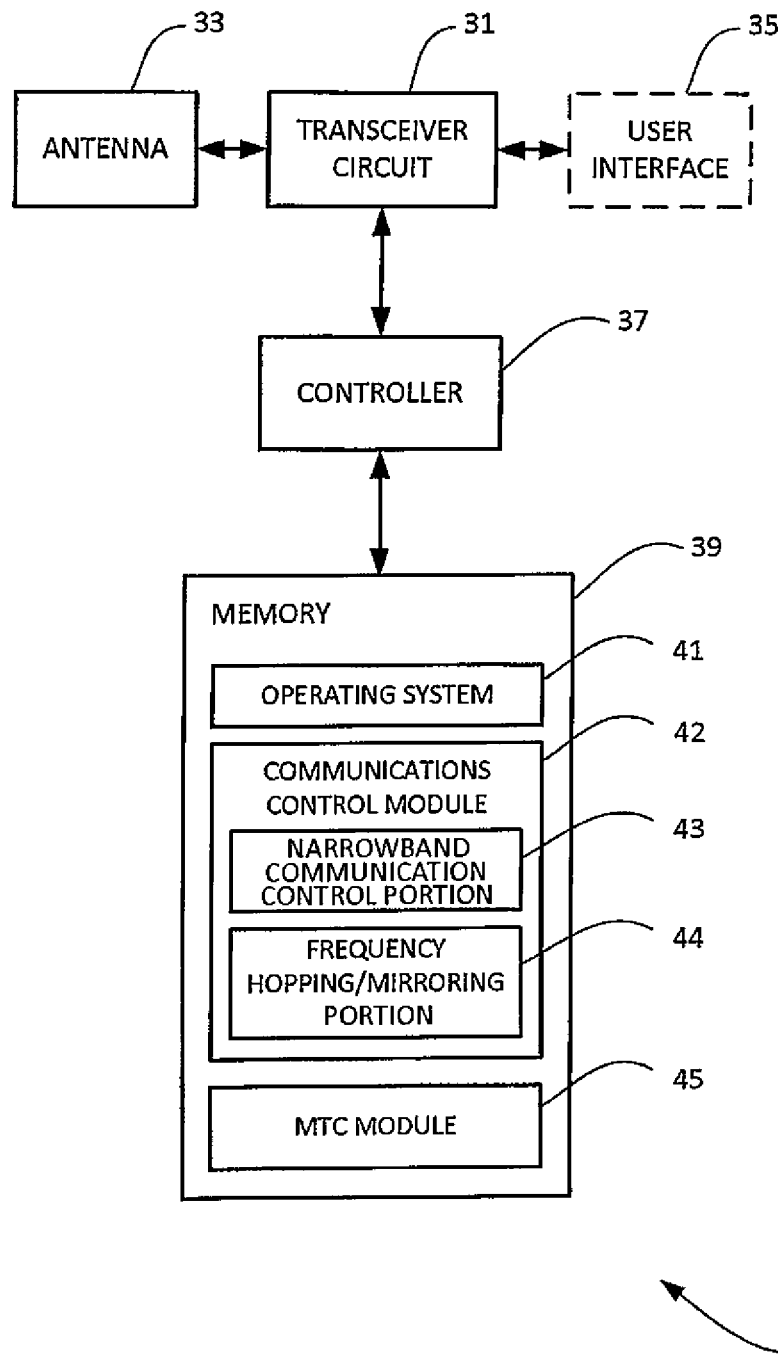
[Fig. 2]

[Fig. 3]
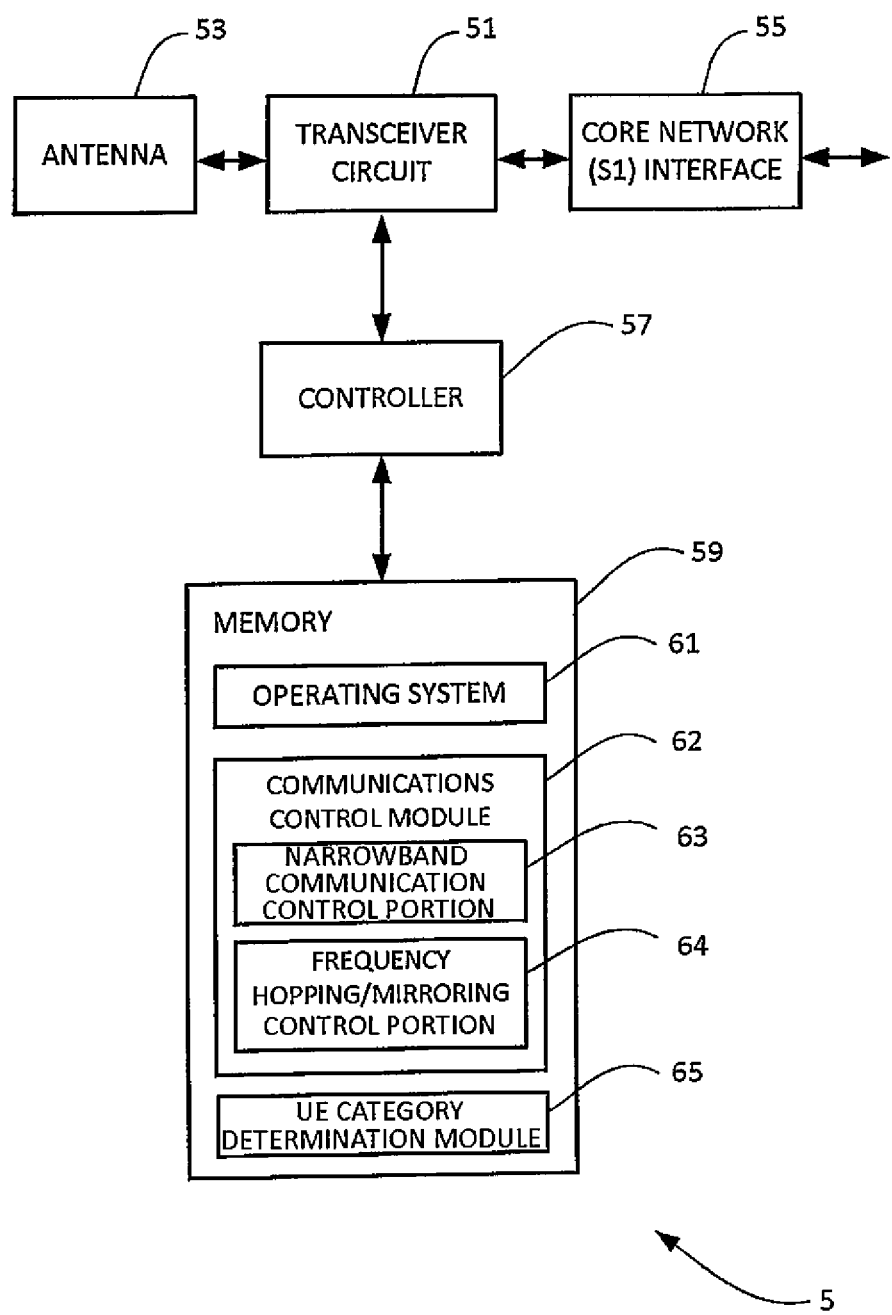

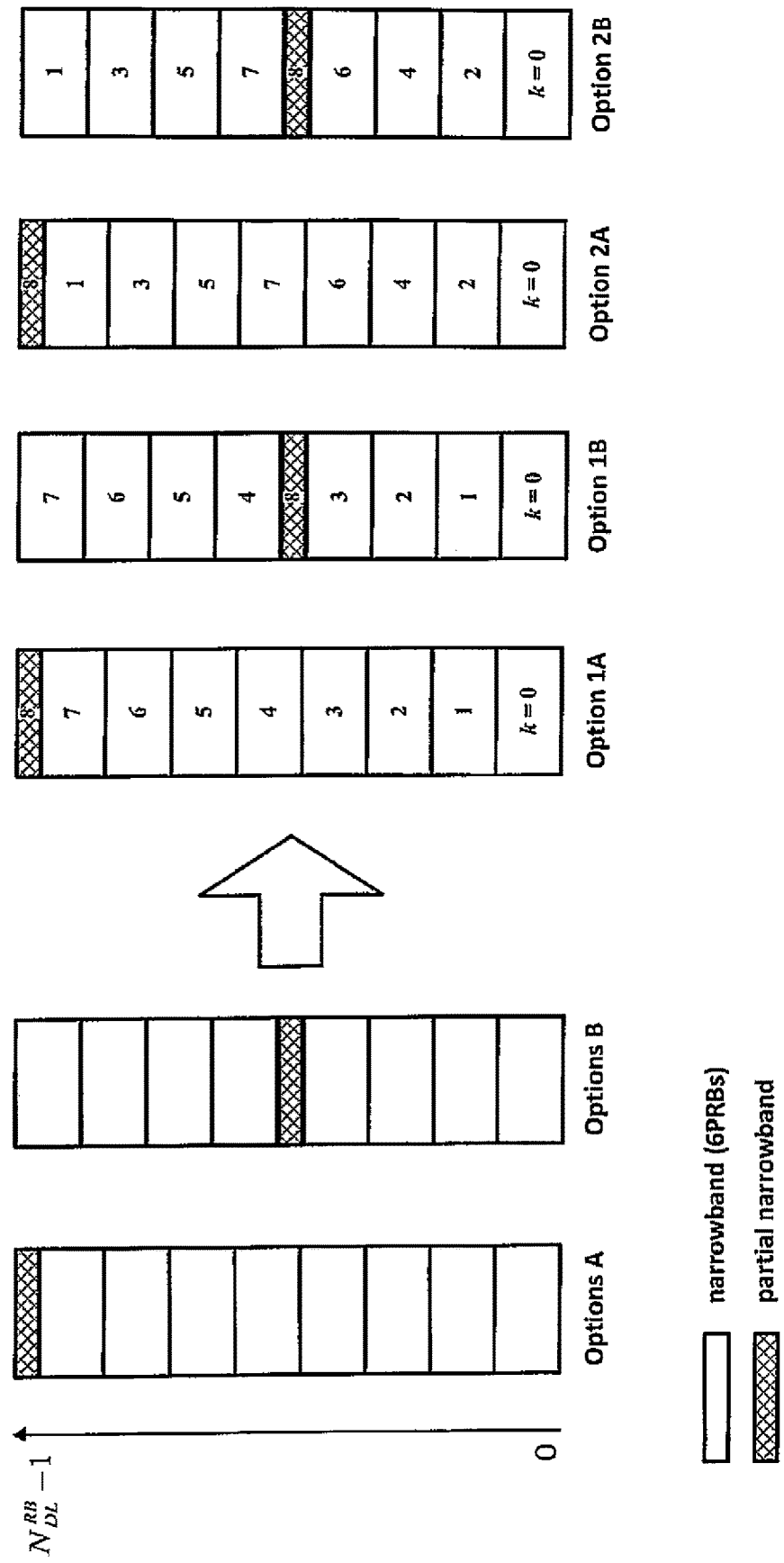
[Fig. 4]

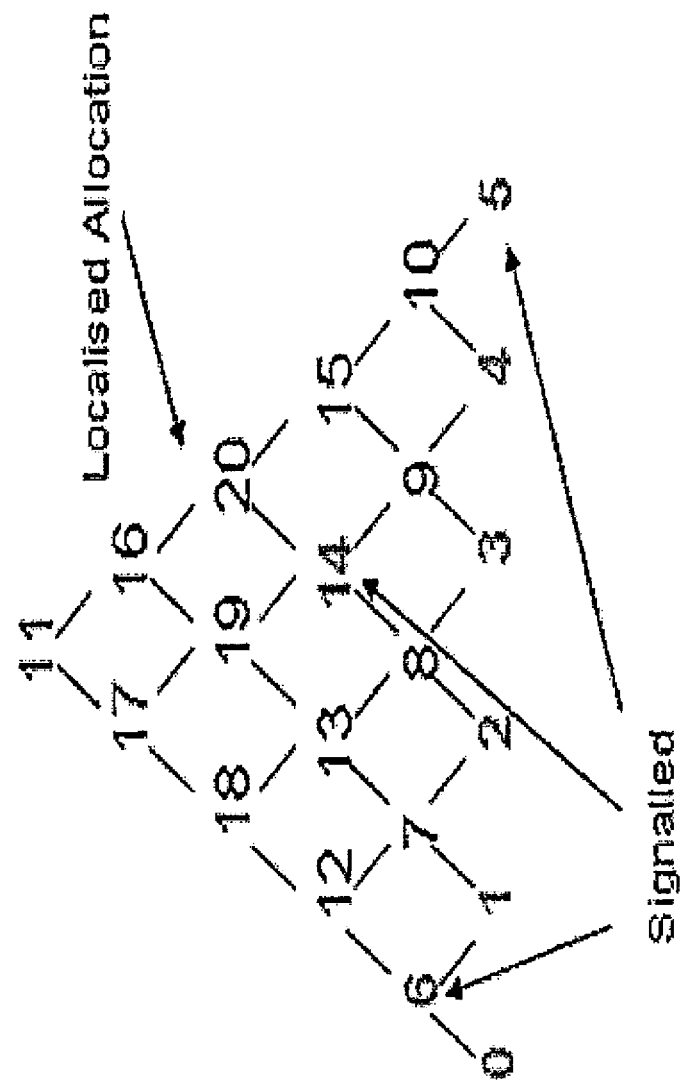
[Fig. 5]

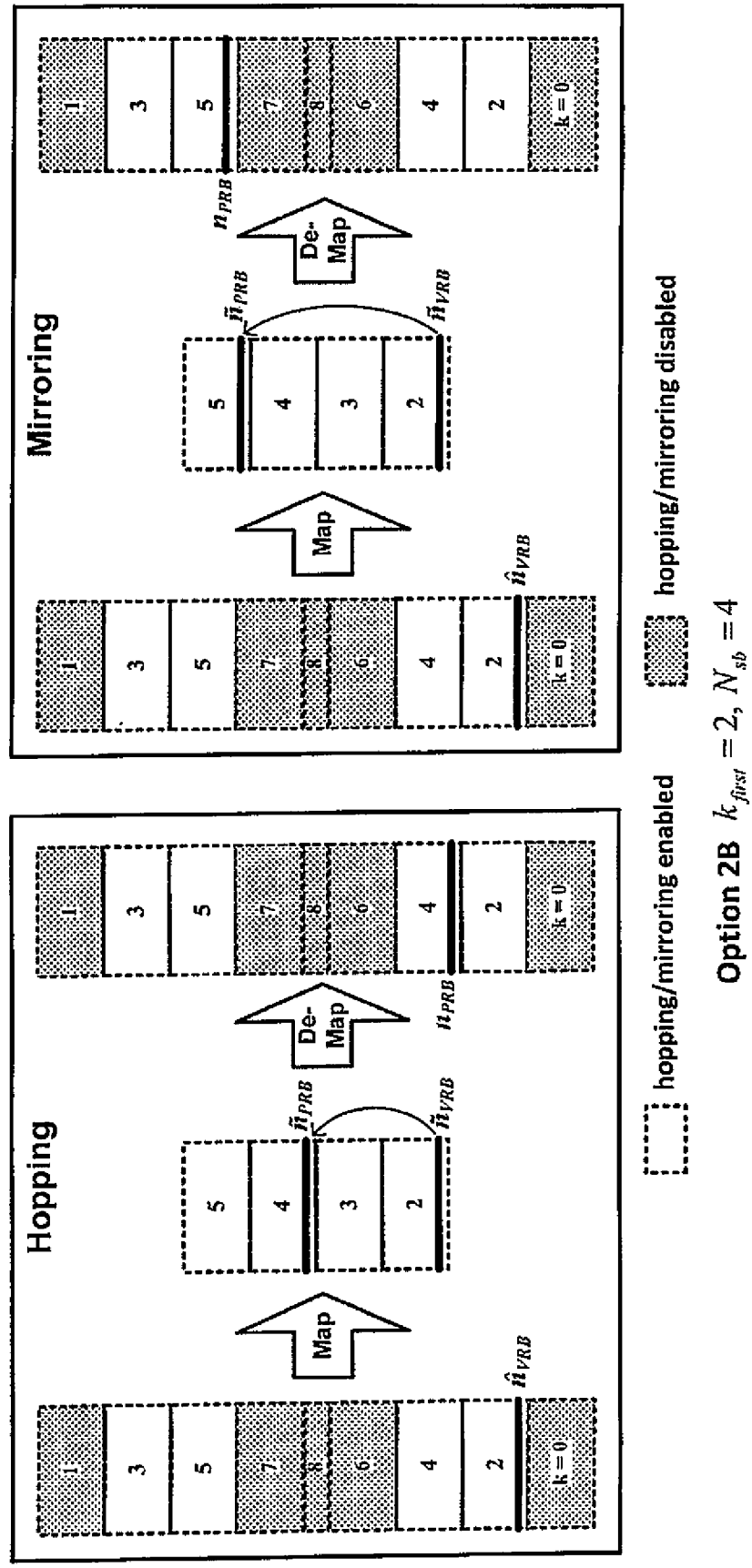

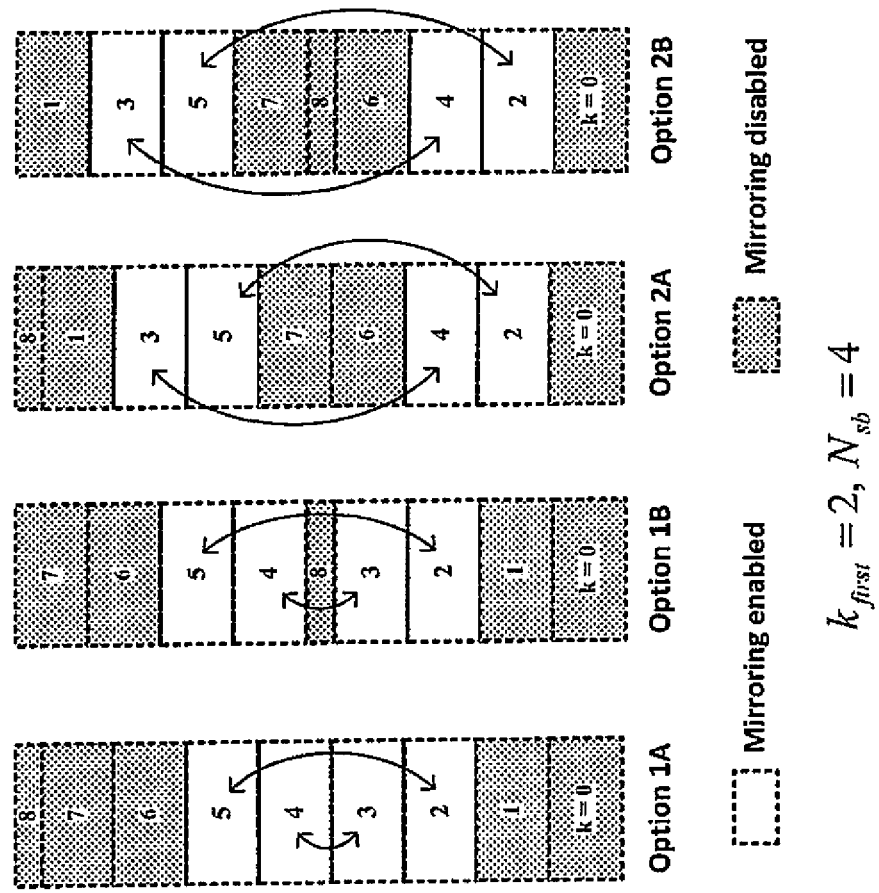

COMMUNICATION SYSTEM

CROSS REFERENCE TO RELATED APPLICATIONS

This application is a National Stage of International Application No. PCT/JP2016/003709, filed Aug. 10, 2016, claiming priority based on United Kingdom Patent Application No. 1514235.9, filed Aug. 12, 2015, the contents of all of which are incorporated herein by reference in their entirety.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

Recent developments in telecommunications have seen a large increase in the use of machine-type communications (MTC) UEs which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices and have been discussed in e.g. 3GPP technical report (TR) 36.888 V12.0.0 titled "Study on provision of low-cost Machine-Type Communications (MTC) User Equipments (UEs) based on LTE" and 3GPP work item document RP-150492 titled "Revised WI: Further LTE Physical Layer Enhancements for MTC". The contents of both documents are incorporated herein by reference.

MTC devices connect to the network whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP TS 22.368 standard (version 12.4.0 for Rel-12 and version 13.1.0 for Rel-13), the contents of which are incorporated herein by reference.

For the Release 13 (Rel-13) version of the standards relating to MTC devices, support for a reduced bandwidth of 1.4 MHz in downlink and uplink is envisaged. Thus, some MTC devices (referred to as 'reduced bandwidth MTC devices') will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components.

Further, the lack of network coverage (e.g. when deployed indoors), in combination with the often limited functionality of MTC devices, can result in such MTC devices having a low data rate and therefore there is a risk of some messages or channels not being received by an MTC device. In order to mitigate this risk and to better support such 'reduced bandwidth' MTC devices, it has been proposed to increase the coverage of certain control channels, for example, the physical broadcast channel (PBCH), the physical random access channel (PRACH), and the physical downlink control channel (PDCCH)—or enhanced PDCCH ('EPDCCH') in Rel-13. This is achieved by repetition of transmitted signals which can result in increased likelihood that the signal is received successfully (e.g. corresponding to up to 20 dB coverage enhancement). To facilitate such enhanced coverage, each MTC device will need to inform its serving base station of the amount of coverage required (e.g. 5 dB/10 dB/15 dB/20 dB coverage enhancement) to allow the base station to adjust its control signalling appropriately.

However, as LTE system bandwidths are typically larger than 1.4 MHz (i.e. up to 20 MHz), the system bandwidth needs to be divided into a plurality of 'narrowbands' (or 'sub-bands'), each comprising a maximum of six physical resource blocks (PRBs), which is the maximum number of PRBs that a 1.4 MHz bandwidth limited MTC device can use in LTE. For Rel-13, narrowbands also need to meet the following requirements, amongst others:

- a set of DL and UL narrow-band(s) needs to be known to UEs;
- PRBs in a narrowband need to be aligned with legacy PRB mapping;
- frequency hopping over the system bandwidth is not to be used for at least the primary and secondary synchronization signals (PSS/SSS) and PBCH;
- at least in coverage enhancement mode, support frequency hopping over the system bandwidth for common messages (such as random access response, paging, MTC system information block(s), and/or the like);
- support hopping patterns between narrowbands;
- each narrowband must comprise a set of contiguous PRBs (e.g. up to six adjacent PRBs);
- at least for TDD, the same set of narrowbands need to be specified for both downlink and uplink; and
- narrowbands must not overlap.

SUMMARY OF INVENTION

Technical Problem

However, the inventors have realised that there is no simple way to provide such narrowbands within the LTE system bandwidth without compromising efficiency of resource allocation signalling for Rel-13 low complexity MTC UEs (and potentially for other, e.g. non-MTC, LTE UEs).

Accordingly, the present invention seeks to provide systems, devices and methods for providing narrowbands such that efficient resource allocation signalling can be achieved for low complexity MTC UEs, whilst also meeting the above requirements.

Solution to Problem

In one aspect, the invention provides communication apparatus for a communication system, wherein the communication apparatus comprises: a controller for operating a cell having a cell bandwidth; a transceiver for communicating, with a plurality of communication devices within said cell; wherein the controller is operable to: treat said cell bandwidth as a plurality of non-overlapping band portions, each band portion comprising a respective set of resource blocks that occupy a narrower frequency bandwidth than said cell bandwidth, and each band portion having a respective index for identifying that band portion; obtain: i) an index of a band portion for use by at least one communication device of said plurality of communication devices; and ii) information for identifying an allocation of at least one resource block within that band portion for use by said at least one communication device; and generate, from said obtained index and said information for identifying an allocation, control data for uniquely identifying a position of said allocation of at least one resource block, within said cell bandwidth; and wherein said transceiver is operable to signal said control data to said at least one communication device.

In another aspect, the invention provides communication apparatus for a communication system, wherein the communication apparatus comprises: a controller for operating a cell having a cell bandwidth; a transceiver for communicating, with a plurality of communication devices within said cell; wherein the controller is operable to: treat said cell bandwidth as a plurality of non-overlapping band portions, each band portion comprising a respective set of resource blocks that occupy a narrower frequency bandwidth than said cell bandwidth, and each band portion having a respective index for identifying that band portion; wherein the plurality of non-overlapping band portions comprises a plurality of equally sized band portions and at least one further band portion having fewer resource blocks than each of said equally sized band portions; obtain information for identifying an allocation of at least one resource block within the at least one further band portion for use by said at least one communication device; and generate, from said obtained information for identifying an allocation, control data for uniquely identifying a position of said allocation of at least one resource block, within said cell bandwidth; and wherein said transceiver is operable to signal said control data to said at least one communication device.

In yet another aspect, the invention provides a communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, the communication device comprising: a transceiver for receiving, from said communication apparatus, control data for uniquely identifying a position of an allocation of at least one resource block, within said cell bandwidth; and a controller for obtaining, from said received control data: i) an index of a band portion for use by said communication device; and ii) information for identifying an allocation of at least one resource block within that band portion for use by said communication device; wherein the transceiver is operable to communicate user data, via said communication apparatus, using said allocation of at least one resource block.

In a further aspect, the invention provides a communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, wherein the plurality of non-overlapping band portions comprises a plurality of equally sized band portions and at least one further band portion having fewer resource blocks than each of said equally sized band portions, the communication device comprising: a transceiver for receiving, from said communication apparatus, control data for uniquely identifying a position of an allocation of at least one resource block, within said cell bandwidth; and a controller for obtaining, from said received control data, information for identifying said allocation of at least one resource block within the at least one further band portion for use by said at least one communication device; wherein the transceiver is operable to communicate user data, via said communication apparatus, using said allocation of at least one resource block.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described by way of example only with reference to the attached figures in which:

BRIEF DESCRIPTION OF DRAWINGS

FIG. 1 schematically illustrates a telecommunication system to which exemplary embodiments of the invention may be applied;

FIG. 2 is a block diagram illustrating the main components of the communication device shown in FIG. 1;

FIG. 3 is a block diagram illustrating the main components of the base station shown in FIG. 1;

FIG. 4 illustrates exemplary ways in which MTC device compatible narrowbands may be provided in the system shown in FIG. 1;

FIG. 5 schematically illustrates a code tree for encoding resource allocations for narrowbands;

FIG. 6 illustrates an exemplary way in which frequency hopping/mirroring can be realised for MTC devices in the system shown in FIG. 1; and FIG. 7 illustrates an exemplary way in which frequency hopping/mirroring can be realised for MTC devices in the system shown in FIG. 1.

OVERVIEW

FIG. 1 schematically illustrates a mobile (cellular) telecommunication system 1 in which communication devices 3 (such as mobile telephone 3-1 and MTC device 3-2) can communicate with each other and/or with other communication nodes via an E-UTRAN base station 5 (denoted 'eNB') and a core network 7. As those skilled in the art will appreciate, whilst one mobile telephone 3-1, one MTC device 3-2, and one base station 5 are shown in FIG. 1 for illustration purposes, the system, when implemented, will typically include other base stations and communication devices.

The base station 5 is connected to the core network 7 via an S1 interface. Although omitted from FIG. 1 for sake of simplicity, the core network 7 includes, amongst others: a gateway for connecting to other networks, such as the Internet and/or to servers hosted outside the core network 7; a mobility management entity (MME) for keeping track of the locations of the communication devices 3 (e.g. the mobile telephone and the MTC device) within the communication network 1; and a home subscriber server (HSS) for storing subscription related information (e.g. information identifying which communication device 3 is configured as a machine-type communication device) and for storing control parameters specific for each communication device 3.

The base station 5 is configured to provide a number of control channels, including, for example, a physical downlink control channel (PDCCH) and a physical uplink control channel (PUCCH). The PDCCH is used by the base station 5 for allocating resources to the communication devices 3 (typically by sending respective UE-specific downlink control information (DCI) to each communication device that has been scheduled in the current scheduling round). The PUCCH is used by the communication devices 3 for sending UE-specific uplink control information (UCI) to the base station (e.g. an appropriate HARQ Ack/Nack feedback corresponding to downlink data received using the resources allocated by a DCI).

Each communication device 3 may fall into one or more of categories of UEs. A first category of UEs include conventional (i.e. non-MTC) communication devices, such as mobile telephones, that are capable of communicating over the entire bandwidth available in the cell of the base station 5. A second category of UEs include reduced bandwidth UEs (e.g. Rel-13 MTC devices capable of using a 1.4 MHz bandwidth only), which are not able to communicate over the entire bandwidth available in the cell of the base station 5. A third category of UEs includes coverage enhanced UEs (e.g. some MTC devices), which require certain base station functionalities to be simplified and/or relaxed (although such coverage enhanced UEs may support other functionalities as normal). It will be understood that the third category of UEs may be considered as a sub-set of the second category of UEs (when capable of using a 1.4 MHz bandwidth only).

In order to support such reduced bandwidth MTC devices in its cell, the system bandwidth of the base station 5 of FIG. 1 is divided into a plurality of non-overlapping narrowbands. The narrowbands within the system bandwidth are allocated such that it is possible to maintain efficient resource allocation signalling for the narrowbands for Rel-13 low complexity MTC UEs. Specifically, a total number of narrowbands in the system bandwidth is defined using the following formula:

$$NB = \left\lceil \frac{N_{RB}^{DL}}{6} \right\rceil \quad \text{[Math. 1]}$$

where NB is the total number of narrowbands in the system bandwidth;

$$N_{RB}^{DL} \quad \text{[Math. 2]}$$

is the total number of downlink (DL) resource blocks in the system bandwidth; and $$\lceil x \rceil \quad \text{[Math. 3]}$$

is a ceiling function (i.e. the smallest integer not less than 'x').

Out of these, the number of whole 6-PRB narrowbands is defined using the formula:

$$NB_{whole} = \left\lfloor \frac{N_{RB}^{DL}}{6} \right\rfloor \quad \text{[Math. 4]}$$

where $NB_{whole}$ is the number of 1.4 MHz narrowbands (each comprising 6 PRBs); and $$\lfloor x \rfloor \quad \text{[Math. 5]}$$

is a flooring function (i.e. the largest integer not greater than 'x').

In this example, the system bandwidth in the cell of the base station 5 is fifty PRBs $$(N_{RB}^{DL}=50), \quad \text{[Math. 6]}$$

which corresponds to approximately 10 MHz of frequency bandwidth. Each narrowband comprises six PRBs (i.e. the maximum number of PRBs that a bandwidth limited MTC device is capable of using). It follows therefore that a maximum of eight whole narrowbands can be provided ($NB_{whole}=8$) which occupy a total of 48 PRBs of the system bandwidth. In addition, there is also provided a single partial narrowband of two PRBs. Thus, the total number of narrowbands is nine (NB=9).

Beneficially, when the narrowbands do not divide exactly into the system bandwidth (most cases), a partial narrowband is defined that contains fewer than six PRBs rather than ignoring these remainder PRBs.

In some examples, this partial narrowband is beneficially defined to be the PRBs closest to the end of the system bandwidth. However, in other, particularly beneficial examples the partial narrowband is defined, away from the edge of the system bandwidth, for example at, or near, the middle of the system bandwidth.

The narrowbands are beneficially provided with index numbers to facilitate efficient assignment of the narrowbands to MTC devices and to facilitate the efficient implementation of hopping from one narrowband to another. In some examples, the indexing is arranged in order of increasing PRB number. However, in other, particularly beneficial examples the indexing is arranged starting from one outer edge of the system bandwidth with index numbers increasing towards the middle of the system bandwidth and alternating between either side of the system bandwidth thereby providing potential improvements in frequency diversity and efficiency in hopping functionality (e.g. as a particular device hops from one narrowband, to another, with index numbers increasing incrementally).

It will be appreciated, however, that if there is a partial narrowband then it is beneficially assigned the highest narrowband index (i.e. 'NB-1', assuming that the lowest narrowband index is '0'), regardless of its placement within the system bandwidth and/or the way narrowbands are numbered. It will also be appreciated that any partial narrowband is not used for frequency hopping, although it may still be used for dynamic assignment to other UEs (i.e. UEs that do not perform frequency hopping and/or UEs that are not limited to 1.4 MHz bandwidth, such as the mobile telephone 3-1 shown in FIG. 1).

However, operators may wish to allocate a separate carrier for MTC devices. Thus, in this case, it will be appreciated that all available resources of such an MTC-specific carrier will be reserved for MTC UEs. In this case, if there is a partial narrowband comprising less than six PRBs, then the resources of such a partial narrowband can also be scheduled to the MTC UEs (along with the resources of the whole 6-RBs narrowbands).

In this example, scheduling of resources is realised, beneficially, by applying joint encoding of the allocated narrowband index and the resource indication value (RIV) defined for Type 2 resource allocations in section 7.1.6.3 of 3GPP TS 36.213 V12.6.0. The RIV encodes a resource allocation comprising a starting resource block and number of contiguously allocated resources blocks into a single unique value.

In this example, the joint encoding of narrowband index and resource allocation is derived using the following formula:

$$JESRIV=RIV+21*k;$$

where JESRIV is a unique value, that is signalled to the MTC device, and that corresponds to a jointly encoded narrowband index and resource indication value; RIV is the resource indication value; and k is the narrowband index.

It can be seen that the use of the jointly encoded narrowband index and resource indication value represents a particularly efficient way of signalling an assigned narrowband (including any partial narrowband) and resource allocation to a particular MTC device.

Advantageously, one unexpected benefit of narrowbands defined as described above, is that it allows the efficient application of frequency hopping. Specifically, the use of such narrowbands makes it possible to support frequency hopping, for MTC devices, using a predefined hopping pattern, by hopping directly from one narrowband to another using the narrowband indexes. This avoids the need to define the relative position of the allocated resources within the entire bandwidth and the size of each hop in terms of number of PRBs. Thus, the benefits associated with frequency hopping, such as higher frequency diversity, can be realised efficiently, using known (e.g. Rel-8) hopping patterns, thereby maintaining backward compatibility.

<Communication Device>

FIG. 2 is a block diagram illustrating the main components of the communication device 3 shown in FIG. 1. The communication device 3 may be an MTC device or a mobile (or 'cellular') telephone configured as a machine-type communication device. The communication device 3 comprises a transceiver circuit 31 which is operable to transmit signals to, and to receive signals from, the base station 5 via at least one antenna 33. Typically, the communication device 3 also includes a user interface 35 which allows a user to interact with the communication device 3, however this user interface 35 may be omitted for some MTC devices.

The operation of the transceiver circuit 31 is controlled by a controller 37 in accordance with software stored in memory 39. The software includes, among other things, an operating system 41, a communication control module 42, and an MTC module 45.

The communication control module 42 controls communications between the communication device 3 and the base station 5 and/or other communication nodes (via the base station 5). As shown in FIG. 2, the communication control module 42 includes, amongst others, a narrowband communication control portion 43 and a frequency hopping/mirroring portion 44.

The MTC module 45 is operable to carry out machine-type communication tasks. For example, the MTC module 45 may (e.g. periodically) receive data from a remote server (via the transceiver circuit 31) over resources allocated to the MTC device 3 by the base station 5. The MTC module 45 may also collect data for sending (e.g. periodically and/or upon detecting a trigger) to a remote server (via the transceiver circuit 31).

<Base Station>

FIG. 3 is a block diagram illustrating the main components of the base station 5 shown in FIG. 1. The base station 5 comprises an E-UTRAN base station (eNB) comprising a transceiver circuit 51 which is operable to transmit signals to, and to receive signals from, the communication devices 3 via one or more antennas 53. The base station 5 is also operable to transmit signals to and to receive signals from a core network 7 via an appropriate core network interface 55 (such as an S1 interface). The operation of the transceiver circuit 51 is controlled by a controller 57 in accordance with software stored in memory 59.

The software includes, among other things, an operating system 61, a communication control module 62, and a UE category determination module 65.

The communication control module 53 controls communications with the communication devices 3 (including any MTC devices). The communication control module 53 is also responsible for scheduling the resources to be used by the communication devices 3 served by this base station 5. As shown in FIG. 3, the communication control module 62 includes, amongst others, a narrowband communication control portion 63 and a frequency hopping/mirroring control portion 64.

In the above description, the communication device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The following is a description of various ways in which narrowbands for MTC devices and associated frequency hopping/mirroring schemes may be provided in LTE systems.

<Operation—Definition of Narrowbands Across the System Bandwidth>

During initial access to the network 1 via the base station 5, each communication device 3 needs to undertake a cell search procedure (i.e. perform symbol and frame timing synchronisations) in order to synchronise its transceiver 31 with the cell of the base station 5. Specifically, the cell search procedure involves obtaining synchronisation signals (i.e. PSS and SSS) and broadcast system information (i.e. PBCH) which are transmitted by the base station 5 in the centre six PRBs of its system bandwidth. Accordingly, Rel-13 low complexity MTC UEs (both in normal coverage and in enhancement coverage mode) are able to carry out such a cell search procedure with the base station 5 (since the centre six PRBs are within the 1.4 MHz bandwidth supported by such MTC devices).

From the system information, the communication device 3 is able to determine the system bandwidth (number of resource blocks) used in the cell of the base station 5. The following is a description of how to divide the system bandwidth into a number of narrowbands (comprising a set of contiguous PRBs) which are not overlapping and how to number such narrowbands.

Narrowband Positions and Numbering

FIG. 4 illustrates exemplary ways in which narrowbands (that are compatible with the MTC device 3-2) may be provided in the cell operated by the base station 5.

As can be seen, in this example, each narrowband comprises six resource blocks, and there is also a partial narrowband (comprising less than six resource blocks). Further, the system bandwidth comprises $N_{RB}^{DL}$ PRBs, [Math. 7]

each PRB having a respective associated resource block index in the range

'0' to '$N_{RB}^{DL}-1$'. [Math. 8]

As explained above, the total number of narrowbands in the system bandwidth is $$NB = \left\lceil \frac{N_{RB}^{DL}}{6} \right\rceil \text{ of which } NB_{whole}$$ [Math. 9]

$$= \left\lfloor \frac{N_{RB}^{DL}}{6} \right\rfloor \text{ are whole 6-PRB narrowheads.}$$

In the case that $N_{RB}^{DL} \mod 6 > 0$ [Math. 10]

there is one 'partial' narrowband that contains fewer than six PRBs. Two schemes for the placement of this partial narrowband will now be introduced:

A) the partial narrowband is the one closest to the end of the system bandwidth; and
B) the partial narrowband is in (or near) the middle of the system bandwidth.

As described above, there are two exemplary ways of numbering the narrowbands:

1) narrowbands are numbered in order of increasing PRB number; and
2) narrowbands are numbered working from the edges of the system bandwidth to the middle of the system bandwidth.

There are, therefore, four candidate options (denoted 'Option 1A', 'Option 1B', 'Option 2A', and 'Option 2B' in FIG. 4) for determining the positions of narrowbands and the location of any remaining PRBs (i.e. a partial narrowband comprising less than six PRBs) within the system bandwidth.

TABLE 1 narrowband placement and numbering options

| Option | $n_{PRB}^{SB}(k)$ (i.e. first PRB of narrowband k) | |
|---|---|---|
| 1A | $6k$ | $0 \leq k < NB$ |
| 1B | $6k$ | $0 \leq k < \left\lceil \frac{NB_{whole}}{2} \right\rceil$ |
|  | $6k + (N_{RB}^{DL} \mod 6)$ | $\left\lceil \frac{NB_{whole}}{2} \right\rceil \leq k < NB_{whole}$ |
|  | $6\left\lceil \frac{NB_{whole}}{2} \right\rceil$ | $k = NB_{whole}$ |

TABLE 1-continued narrowband placement and numbering options

| Option | $n_{PRB}^{SB}(k)$ (i.e. first PRB of narrowband k) | |
|---|---|---|
| 2A | $6\frac{k}{2}$ | $0 \leq k < NB_{whole}$, $k \mod 2 = 0$ |
|  | $6NB_{whole} - 6\left\lceil \frac{k}{2} \right\rceil$ | $0 \leq k < NB_{whole}$, $k \mod 2 = 1$ |
|  | $6NB_{whole}$ | $k = NB_{whole}$ |
| 2B | $6\frac{k}{2}$ | $0 \leq k < NB_{whole}$, $k \mod 2 = 0$ |
|  | $6NB_{whole} + (N_{RB}^{DL} \mod 6) - 6\left\lceil \frac{k}{2} \right\rceil$ | $0 \leq k < NB_{whole}$, $k \mod 2 = 1$ |
|  | $6\left\lceil \frac{NB_{whole}}{2} \right\rceil$ | $k = NB_{whole}$ |

Using a 10 MHz (50 PRBs) system bandwidth as an example, gives $NB_{whole}=8$ and $NB=9$. It will be appreciated that whenever there is a partial narrowband it is assigned number $NB_{whole}$. It is assumed that any partial narrowband will not be used for frequency hopping, although it can be used for dynamic assignment to other UEs (e.g. non-MTC UEs or MTC UEs not performing frequency hopping).

Let $n_{PRB}^{SB}(k)$ [Math. 11]

be the first PRB of narrowband k where $0 \leq k < NB$. [Math. 12]

The details of how each PRB of the system bandwidth can be assigned to a given narrowband (or partial narrowband) are given in Table 1 above.

Resource Allocation Signalling for Narrowbands

A network operator may allocate a separate carrier for MTC services, so, it is desirable that all available resources in such a separate carrier are utilized for MTC UEs. As discussed above, there might be a number of remaining resources (i.e. partial narrowband) that comprise less than six PRBs if the number of PRBs in the system bandwidth is not divisible by six (assuming that a narrowband is defined as comprising six PRBs). The following is a description of some exemplary solutions for scheduling resource blocks forming part of a partial narrowband.

Solution 1

In this solution Type 2 resource allocation (Type 2 RA) and a resource indication value (RIV) is used for scheduling resource blocks forming part of a partial narrowband.

3GPP TS 36.213 V12.6.0 defines RIV for Type 2 resource allocation as a value corresponding to a starting resource block ('$RB_{start}$') and a length in terms of virtually contiguously allocated resource blocks denoted '$L_{CRBs}$'. The resource indication value (for downlink) is defined using the following formulas:

if $(L_{CRBs}-1) \leq \lfloor N_{RB}^{DL}/2 \rfloor$ then $RIV = N_{RB}^{DL}(L_{CRBs}-1) + RB_{start}$ else $RIV = N_{RB}^{DL}(N_{RB}^{DL} - L_{CRBs}+1) + (N_{RB}^{DL}-1-RB_{start})$ where $L_{CRBs} \geq 1$ and shall not exceed $N_{RB}^{DL} - RB_{start}$.

In Solution 1, the equation of Type 2 RA is $\log_2(NB\_RB(NB\_RB+1)/2)$ bits where $NB\_RB=6$ (assuming that a narrowband is defined as having six PRBs). In this case, therefore, the maximum resource indication value (RIV) is 20 which can be signalled to the scheduled MTC UE (e.g. MTC device 3-2) using a 5 bit binary representation. It will be appreciated that the PRBs in the partial narrowband can be indexed starting from the lowest available PRB when utilising such a Type 2 resource allocation.

In this case, the total signalling overhead can be calculated from the number of narrowbands and the above described Type 2 RA as:

$\log_2(NB)+\log_2(NB\_RB(NB\_RB+1)/2)$ bits.

Solution 2

Another possible solution (for scheduling resource blocks forming part of a partial narrowband) is to apply joint encoding of the allocated narrowband index and Type 2 resource allocation. Beneficially, such joint encoding reduces the signalling overhead compared to Solution 1. The overhead reduction is achieved by using the unused RIV values (21-31) of every narrowband, hence reducing the total number of bits required to represent the narrowband index and resource allocation signalling.

In this case, joint encoding of narrowband index and resource indication value (JESRIV) is given by the formula:

JESRIV=RIV+21*k where RIV is given by legacy Type 2 resource allocation and k is the index of the allocated narrowband.

At the receiver, to get narrowband index and RIV value from such a jointly encoded narrowband index and resource indication value, the decoder can be implemented as follows:

$$k = \left\lfloor \frac{JESRIV}{21} \right\rfloor \text{ and } RIV = JESRIV \bmod 21 \qquad \text{[Math. 14]}$$

or $$RIV = JESRIV - 21\left\lfloor \frac{JESRIV}{21} \right\rfloor$$

The overhead for Solution 2 can be calculated as:

$$\log_2\left(21 * \left\lfloor \frac{N_{RB}^{DL}}{6} \right\rfloor + x(x+1)/2\right) \text{ bits} \qquad \text{[Math. 15]}$$

where $x = N_{RB}^{DL} \bmod 6$.

Table 2 includes a comparison of overhead values for Solution 1 and Solution 2 for typical system bandwidths used in LTE.

TABLE 2 overhead comparison of solutions 1 and 2

| System BW MHz ($N_{RB}^{DL}$) | Solution 1: separate signalling of narrowband index and Type 2 resource indication = $\log_2(NB)$ + $\log_2(NB\_RB(NB\_RB + 1)/2)$ | Solution 2: joint encoding of narrowband index and resource indication = $\log_2\left(21 * \left\lfloor \frac{N_{RB}^{DL}}{6} \right\rfloor + x(x+1)/2\right)$ bits where $x = N_{RB}^{DL} \bmod 6$ |
|---|---|---|
| 3 MHz (15 RB) | 2 + 5 = 7 | 6 |
| 5 MHz (25 RB) | 3 + 5 = 8 | 7 |
| 10 MHz (50 RB) | 4 + 5 = 9 | 8 |
| 15 MHz (75 RB) | 4 + 5 = 9 | 9 |
| 20 MHz (100 RB) | 5 + 5 = 10 | 9 |

Solution 3

FIG. 5 schematically illustrates an exemplary code tree that may be used for encoding and signalling resource allocations for partial narrowbands in the system shown in FIG. 1.

In this case, a triangular code tree is used with the number of PRBs available within a particular narrowband being equal to the number of leaf nodes at the base of the code tree. As shown, the code tree is formed from a tree of nodes having a depth of N nodes corresponding to the number of PRBs within the narrowband and having N leaf nodes in the bottom row of the code tree. In this example, there are six PRBs per narrowband and therefore, the tree has a depth of six and there are six leaf nodes (nodes '0' to '5') at the base of the code tree. The total number of nodes within the tree equals to N(N+1)/2. A node number from this code tree can therefore be signalled using cell($\log_2(N*(N+1)/2)$) number of bits.

Solution 3 is similar to Solution 1 in that RIV and the narrowband index k are signalled separately. However in this case it is assumed that $$0 \le k < \left\lfloor \frac{N_{RB}^{DL}}{6} \right\rfloor, \qquad \text{[Math. 16]}$$

i.e. the narrowband index of the partial narrowband cannot be signalled to the UE. Beneficially, depending on the value of $$N_{RB}^{DL}, \qquad \text{[Math. 17]}$$

Solution 3 may reduce the number of bits needed to signal k compared to Solution 1.

In order to signal a resource allocation in the partial narrowband the fact that there is some redundancy in the signalling of RIV is taken advantage of. Specifically, to signal any contiguous resource allocation in six PRBs a range of $$0 \leq RIV < 21 \qquad \text{[Math. 18]}$$

is sufficient (as illustrated in FIG. 5). In practice, the RIV can be signalled using 5 bits to cover any resource allocation in the range of $$0 \leq RIV < 21. \qquad \text{[Math. 19]}$$

However, it means that codes $$21 \leq RIV < 32 \qquad \text{[Math. 20]}$$

(when 5 bits are signalled) are not used for signalling any resource allocation in a 6-RB narrowband. Beneficially, codes $$21 \leq RIV < 32 \qquad \text{[Math. 21]}$$

may be used along with k to signal a resource allocation in the partial narrowband. For example, if the MTC device 3-2 receives $$21 \leq RIV < 32 \qquad \text{[Math. 22]}$$

then it can calculate (using its narrowband module 43) RIV'=RIV−21+11 k and interpret this as a resource allocation in the partial narrowband.

The partial narrowband contains at most five PRBs and so the number of possible contiguous resource allocations within the partial narrowband is at most 15. Even if k consists of only 1 bit, the range of RIV' as defined above is between '0' and '21'. Therefore using this scheme it is possible to signal any contiguous resource allocation within the partial narrowband.

The scheme according to Solution 3 is summarised in Table 3.

TABLE 3

| signalling of resource allocations | | |
|---|---|---|
| | Interpretation | |
| Signalled value of RIV | Narrowband | Resource indication within the narrowband |
| 0-20 | k | RIV |
| 21-31 | Partial narrowband | RIV' = RIV − 21 + 11k |

The number of signalling bits required for Solution 3 is $$\left\lceil \log_2\left(\left\lceil \frac{N_{RB}^{DL}}{6} \right\rceil\right) \right\rceil + 5. \qquad \text{[Math. 23]}$$

<Operation—Frequency Hopping/Mirroring for MTC Devices>

FIGS. 6 and 7 illustrate exemplary ways in which frequency hopping/mirroring can be realised for the MTC device 3-2 when communicating using narrowbands.

As there are a number of options for narrowband definitions and numbering (e.g. any combination of options A/B and ½ above) and for the location of any partial narrowband (i.e. remaining PRBs), a generic frequency hopping scheme is defined that can be adapted for LTE Rel-13 MTC devices. Beneficially, this hopping scheme re-uses legacy (Rel-8) hopping patterns for improved backward compatibility.

Specifically, Rel-8 frequency-hopping schemes are re-used with a predefined hopping pattern for MTC transmissions. Advantageously, since the hopping pattern is cell-specific, there is no collision among hopping UEs in the same cell (e.g. the communication devices 3 within the cell of the base station 5).

The legacy (Rel-8) hopping scheme is defined as follows:

$$\tilde{n}_{PRB}(n_s) = (\tilde{n}_{VRB} + f_{hop}(i) \cdot N_{RB}^{sb} + \qquad \text{[Math. 24]}$$
$$((N_{RB}^{sb} - 1) - 2(\tilde{n}_{VRB} \bmod N_{RB}^{sb})) \cdot f_m(i)) \bmod (N_{RB}^{sb} \cdot N_{sb})$$

$$i = \begin{cases} \lfloor n_s/2 \rfloor & \text{inter – subframe hopping} \\ n_s & \text{intra and inter – subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

where $n_{VRB}$ is an index of a resource block which is obtained from the scheduling grant, $$N_R^{HO} \qquad \text{[Math. 25]}$$

is a hopping offset for the physical uplink shared channel (PUSCH);

$$N_{sb} \in \{2,3,4,\ldots\} \qquad \text{[Math. 26]}$$

is the number of active narrowbands for which frequency hopping is enabled (the value of which is given by higher layers); and $n_s$ is a slot number within a sub-frame.

However, in order to adapt the above hopping scheme for MTC transmission (via narrowbands) the following changes are made.

Let k be a narrowband index, $$0 \leq k < NB. \qquad \text{[Math. 27]}$$

It is assumed that hopping/mirroring is only applied in narrowbands $$k_{first} \leq k < k_{first} + N_{sb} \qquad \text{[Math. 28]}$$

where $k_{first}$ and $N_{sb}$ are pre-defined or set by higher layers such that $$N_{sb} \geq 1 \qquad \text{[Math. 29]}$$

and $$k_{first} + N_{sb} \leq NB_{whole}. \qquad \text{[Math. 30]}$$

Effectively, $k_{first}$ indicates the index of the first narrowband for which frequency hopping is to be applied, and $N_{sb}$ indicates the number of consecutively numbered narrowbands (starting from $k_{first}$) for which frequency hopping is to be applied. The purpose of $k_{first}$ and $N_{sb}$ is to allow narrowbands at the edges of the system bandwidth to be excluded from hopping/mirroring. It will be appreciated that if there is a partial narrowband, then it is assigned index k=$NB_{whole}$ and thus it is always excluded from hopping/mirroring (because of the condition $$k_{first} + N_{sb} \leq NB_{whole}).$$

Let $$0 \leq \tilde{n}_{VRB} < 6 \qquad \text{[Math. 32]}$$

represent a resource block within a narrowband signalled in the resource assignment, and let $$0 \leq k_{VRB} < NB \qquad \text{[Math. 33]}$$

be the narrowband index of the narrowband which contains $$\hat{n}_{VRB}.$$ [Math. 34]

If $k_{VRB}$ is a narrowband in which hopping/mirroring is not applied ($k_{VRB} < k_{first}$ or $$k_{VRB} \geq k_{first} + N_{sb})$$ [Math. 35]

then the resource block allocation after frequency hopping, i.e. $n_{PRB}(n_s)$, is set according to the following equation:

$$n_{PRB}^{SB}(k_{VRB})$$ [Math. 36]

Where $$n_{PRB}^{SB}(k_{VRB})$$ [Math. 37]

is defined in accordance with Table 1 above.

If $k_{VRB}$ is a narrowband in which hopping/mirroring is applied (i.e.

$$k_{first} \leq k < k_{first} + N_{sb})$$ [Math. 38]

then $n_{PRB}(n_s)$ is determined as follows.

Frequency Hopping Scheme

[Math. 39]

$$\tilde{n}_{PRB}(n_s) = (\tilde{n}_{VRB} + 6 f_{hop}(i)) \bmod 6 N_{sb}$$

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s) \bmod 6)$$

$$\tilde{n}_{VRB} = 6(k_{VRB} - k_{first}) + \hat{n}_{VRB}$$

$$i = SFN \bmod 10$$

where $f_{hop}(i)$ is a hopping pattern that gives (in dependence on the sub-frame number (SFN)) a pseudo random integer that defines the number of narrowbands to be hopped;

$$\hat{n}_{VRB}$$ [Math. 40]

is an index of a resource block before hopping; and $n_{PRB}(n_s)$ is an index, relative to a narrowband, of an allocated resource block after applying frequency hopping to $$\hat{n}_{VRB}.$$ [Math. 41]

Advantageously, the hopping pattern $f_{hop}(i)$ may be defined the same way as in Rel-8, which ensures backwards compatibility.

In summary, the idea is first to map the PRBs in narrowbands $$k_{first} \leq k < k_{first} + N_{sb}$$ [Math. 42]

to a contiguous range of PRBs indexed by $$\tilde{n}_{VRB}$$ [Math. 43]

Where $$0 \leq \tilde{n}_{VRB} < 6 N_{sb}.$$ [Math. 44]

Then the legacy frequency hopping scheme is applied in this contiguous range in order to obtain $$0 \leq \tilde{n}_{PRB}(n_s) < 6 N_{sb}.$$ [Math. 45]

Finally $$\tilde{n}_{PRB}(n_s)$$

is mapped back to the original narrowbands in order to obtain $n_{PRB}(n_s)$.

Beneficially, it will be appreciated that this frequency hopping scheme is substantially equivalent to the legacy frequency hopping scheme of Rel-8 with the following changes:

The hopping rate is once per radio frame, with a period of 10 radio frames. The last sub-frame of each radio frame can be used for retuning;

The hopping narrowband size is fixed to six PRBs; and $f_m(i)$ is set to zero (because there is little frequency diversity benefit to be gained by applying mirroring within a 6-RB narrowband).

Mirroring Scheme

If mirroring is used (i.e. $f_m(i)$ is not set to zero), then it is possible to define an MTC device compatible frequency mirroring scheme based on the same basic idea that has been described above for frequency hopping. Specifically, narrowband mirroring is achieved by first mapping the narrowbands to a contiguous range, and (instead of frequency hopping) applying frequency mirroring within this contiguous range in blocks of six PRBs, as follows:

[Math. 47]

$$\tilde{n}_{PRB}(n_s) = \begin{cases} \tilde{n}_{VRB} & i \bmod 2 = 0 \\ 6\left(N_{sb} - 1 - \left\lfloor \frac{\tilde{n}_{VRB}}{6} \right\rfloor\right) + (\tilde{n}_{VRB} \bmod 6) & i \bmod 2 = 1 \end{cases}$$

where $i$, $N_{sb}$), $$\tilde{n}_{VRB}$$ [Math. 48]

and $n_{PRB}(n_s)$ are defined in the same way as for the frequency hopping case above.

FIG. 7 illustrates exemplary frequency hopping/frequency mirroring in accordance with the above schemes for the values of $k_{first}=2$ and $N_{sb}=4$. Moreover, FIG. 8 illustrates exemplary frequency mirroring schemes for different narrowband numbering options (using $k_{first}=2$ and $N_{sb}=4$).

It will be appreciated that when inter-cell interference is also taken into account, frequency hopping is likely to have better performance than frequency mirroring alone due to the presence of the interference randomisation function $f_{hop}(i)$. However, it will be appreciated the above described frequency mirroring scheme may be used with or without an associated frequency hopping pattern.

<Modifications and Alternatives>

Detailed embodiments have been described above. As those skilled in the art will appreciate, a number of modifications and alternatives can be made to the above embodiments whilst still benefiting from the inventions embodied therein.

It was agreed by 3GPP that the PSS/SSS/PBCH are independent of any narrowband. Thus, each communication device 3 needs to monitor (by tuning its transceiver 31) the centre 72 subcarriers (i.e. the centre six PRBs) of a cell in order to obtain the PSS/SSS/PBCH of that cell, regardless of how the narrowbands are defined. However, since the PSS/SSS/PBCH are independent of any narrowband structure, the PSS/SSS/PBCH may span across two narrowbands. In this case, it will be appreciated that the base station 5 may prioritise transmission of PSS/SSS/PBCH over any other transmission in the affected resource blocks (i.e. in any narrowband overlapping with the centre six PRBs carrying the PSS/SSS/PBCH) in order to avoid collision of transmissions.

Although the above description of narrowband positions and numbering is based on the downlink case, it will be appreciated that it is also applicable for uplink, e.g. by replacing $$N_{RB}^{DL} \quad \text{[Math. 49]}$$

with $$N_{RB}^{UL} \quad \text{[Math. 50]}$$

(where $$N_{RB}^{UL} \quad \text{[Math. 51]}$$

is the total number of uplink resource blocks in the system bandwidth).

It will be appreciated that although the above exemplary embodiments have been described using the term 'narrowband' when referring to a portion of the system bandwidth, the term 'sub-band' may also be used. Accordingly, the term narrowband and sub-band have the same meaning and can be used interchangeably.

It will be appreciated that although the communication system is described in terms of the base station operating as a E-UTRAN base station (eNB), the same principles may be applied to base stations operating as macro or pico base stations, femto base stations, relay nodes providing elements of base station functionality, home base stations (HeNB), or other such communication nodes.

In the above exemplary embodiments, an LTE telecommunications system was described. As those skilled in the art will appreciate, the techniques described in the present application can be employed in other communications systems, including earlier 3GPP type systems. Other communications nodes or devices may include user devices such as, for example, personal digital assistants, laptop computers, web browsers, etc.

In the exemplary embodiments described above, the base station and the communication device each include transceiver circuitry. Typically, this circuitry will be formed by dedicated hardware circuits. However, in some embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

In the above exemplary embodiments, machine-type communication devices and mobile telephones are described. However, it will be appreciated that mobile telephones (and similar user equipment) may also be configured to operate as machine-type communication devices. For example, the mobile telephone 3-1 may include (and/or provide the functionality of) the MTC module 45.

Examples of MTC Applications

It will be appreciated that each communication device may support one or more MTC applications. Some examples of MTC applications are listed in the following table (source: 3GPP TS 22.368 V13.1.0, Annex B). This list is not exhaustive and is intended to be indicative of the scope of machine-type communication applications.

TABLE 4

| Service Area | MTC applications |
| --- | --- |
| Security | Surveillance systems |
|  | Backup for landline |
|  | Control of physical access (e.g. to buildings) |
|  | Car/driver security |
| Tracking & | Fleet Management |
| Tracing | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote | Sensors |
| Maintenance/ | Lighting |
| Control | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer | Digital photo frame |
| Devices | Digital camera |
|  | eBook |

The plurality of non-overlapping band portions might comprise a plurality of equally sized band portions. In this case, the plurality of non-overlapping band portions might comprise a plurality of equally sized band portions the indexes of which might be numeric and might be arranged to increase sequentially with the frequency range covered by frequency bandwidth of the band portion that they represent. Alternatively, the plurality of non-overlapping band portions might comprise a plurality of equally sized band portions the indexes of which might be numeric and might be arranged with the lowest indexes representing band portions at upper and lower frequency edges of the cell bandwidth, and with the indexes increasing towards the centre of the cell bandwidth.

The number of said plurality of band portions might be defined using the formula:

$$NB = \left\lceil \frac{N_{RB}}{n} \right\rceil \quad \text{[Math. 52]}$$

where NB is the total number of said band portions (each equally sized band portion comprising a set of 'n' resource blocks); $N_{RB}$ is the total number of resource blocks in the cell bandwidth; and $$\lceil x \rceil \quad \text{[Math. 53]}$$

is a ceiling function (i.e. the smallest integer not less than 'x').

The number of said equally sized band portions might be defined using the formula:

$$NB_{whole} = \left\lfloor \frac{N_{RB}}{n} \right\rfloor \qquad \text{[Math. 54]}$$

where $NB_{whole}$ is the number of said equally sized band portions each comprising a set of 'n' resource blocks; and $$\lfloor x \rfloor \qquad \text{[Math. 55]}$$

is a flooring function (i.e. the largest integer not greater than 'x').

The obtained index might be an index of one of said equally sized band portions, in which case the controller might operable to generate said control data for uniquely identifying a position of said allocation of at least one resource block by jointly encoding said obtained index and said information for identifying an allocation to form jointly encoded control data.

The jointly encoded control data might be derived using the following formula:

JESRIV=RIV+21*k where JESRIV is the jointly encoded control data; k is the obtained index; and RIV is the information for identifying an allocation and comprises a unique value representing an allocation of at least one resource block within band portion k.

The controller of the communication device might be operable to obtain, from the jointly encoded control data, the information for identifying an allocation of at least one resource block using the following formula:

$$k = \left\lfloor \frac{JESRIV}{21} \right\rfloor \text{ and} \qquad \text{[Math. 56]}$$

$$RIV = JESRIV \bmod 21$$

where JESRIV is the jointly encoded control data; k is the index of a band portion for use by said communication device; and RIV is the information for identifying an allocation and comprises a unique value representing an allocation of at least one resource block within band portion k.

The plurality of band portions might comprise at least one further band portion having fewer resource blocks than each of said equally sized band portions. The at least one further band portion might be assigned a higher numeric index than said each of said equally sized band portions. The at least one further band portion might be located: at an outside edge of said cell bandwidth; or at/near a centre portion of said cell bandwidth.

The controller might be operable to generate control data for (or obtain, from said control data, information) uniquely identifying an allocation of at least one resource block within the at least one further band portion comprising a first value (k) and a second value (RIV) wherein said first value and said second value are related through a predefined mathematical relationship to a resource indication value (RIV') representing a starting resource block ($RB_{start}$) and a length ($L_{CRB}$), in contiguously allocated resource blocks, of said allocation of at least one resource block within the at least one further band portion.

The predefined mathematical relationship between said first value (k), said second value (RIV) and said resource indication value (RIV') might be defined using the following formula: RIV'=RIV−21+11 k.

The controller might be configured to allocate resources (or determine allocated resources) in accordance with a hopping pattern in which the band portion used for communication with the at least one communication device changes following at least one frequency hop but the allocation of at least one resource block within that band portion used for said communication does not change.

In this case, the controller might be configured to allocate resources (or determine allocated resources) using the following scheme:

$$n_{PRB}(n_s) = n_{PRB}^{SB}\left( \left\lfloor \frac{\tilde{n}_{PRB}(n_s)}{6} \right\rfloor + k_{first} \right) + (\tilde{n}_{PRB}(n_s) \bmod 6) \qquad \text{[Math. 57]}$$

wherein $\tilde{n}_{PRB}(n_s) = (\tilde{n}_{VRB} + 6 f_{hop}(i)) \bmod 6 N_{sb}$ wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said hopping pattern; $n_s$ is a slot number within a sub-frame; $f_{hop}(i)$ is the hopping pattern; SFN is a sub-frame number; $k_{first}$ is the lowest band portion index for which the hopping pattern is being applied; $N_{sb}$ is the number of consecutively numbered band portions, starting from $k_{first}$, for which the hopping pattern is being applied; $k_{VRB}$ is an index of a band portion in which the hopping pattern is being applied;

$$n_{PRB}^{SB}(k) \qquad \text{[Math. 58]}$$

is the index, relative to the cell bandwidth, of a first resource block of band portion having index k; and $$\hat{n}_{VRB} \qquad \text{[Math. 59]}$$

is the index, relative to a band portion, of an allocated resource block.

The controller might be configured to allocate resources (or determine allocated resources) in accordance with a mirroring pattern in at least some band portions, wherein the index of the band portion used for communication with the at least one communication device alternates between an index of a higher numerically indexed half of the at least some band portions and an index of a lower numerically indexed half of the at least some band portions.

In this case, the controller might be configured to allocate resources (or determine allocated resources) using the following scheme:

$$n_{PRB}(n_s) = n_{PRB}^{SB}\left( \left\lfloor \frac{\tilde{n}_{PRB}(n_s)}{6} \right\rfloor + k_{first} \right) + (\tilde{n}_{PRB}(n_s) \bmod 6) \qquad \text{[Math. 60]}$$

wherein $$\tilde{n}_{PRB}(n_s) = \begin{cases} \tilde{n}_{VRB} & i \bmod 2 = 0 \\ 6\left(N_{sb} - 1 - \left\lfloor \frac{\tilde{n}_{VRB}}{6} \right\rfloor\right) + (\tilde{n}_{VRB} \bmod 6) & i \bmod 2 = 1 \end{cases}$$

wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said mirroring pattern; $n_s$ is a slot number within a sub-frame; SFN is a sub-frame number; $k_{first}$ is the lowest band portion index for which said mirroring pattern is being applied; $N_{sb}$ is the number of consecutively numbered band portions for which said mirroring pattern is being applied; $k_{VRB}$ is an index of a band portion in which said mirroring pattern is being applied;

$$n_{PRB}^{SB}(k) \quad \text{[Math. 61]}$$

is the index, relative to the cell bandwidth, of a first resource block of band portion having index k; and $$\hat{n}_{VRB} \quad \text{[Math. 62]}$$

is the index, relative to a band portion, of an allocated resource block.

The communication apparatus might comprise a base station of a long term evolution (LTE) radio access network. The communication device might comprise a machine-type communication (MTC) device which is operable to communicate using a reduced bandwidth compared to the cell bandwidth.

Various other modifications will be apparent to those skilled in the art and will not be described in further detail here.

The whole and ort of the exemplary embodiments disclosed above can be described as, but not limited to, the following supplementary notes.

(Supplementary note 1) Communication apparatus for a communication system, wherein the communication apparatus comprises:
  a controller for operating a cell having a cell bandwidth;
  a transceiver for communicating, with a plurality of communication devices within said cell;
  wherein the controller is operable to:
    treat said cell bandwidth as a plurality of non-overlapping band portions, each band portion comprising a respective set of resource blocks that occupy a narrower frequency bandwidth than said cell bandwidth, and each band portion having a respective index for identifying that band portion;
    obtain: i) an index of a band portion for use by at least one communication device of said plurality of communication devices; and ii) information for identifying an allocation of at least one resource block within that band portion for use by said at least one communication device; and
    generate, from said obtained index and said information for identifying an allocation, control data for uniquely identifying a position of said allocation of at least one resource block, within said cell bandwidth; and
  wherein said transceiver is operable to signal said control data to said at least one communication device.

(Supplementary note 2) The communication apparatus according to Supplementary note 1, wherein the plurality of non-overlapping band portions comprises a plurality of equally sized band portions.

(Supplementary note 3) The communication apparatus according to Supplementary note 2, wherein the plurality of non-overlapping band portions comprises a plurality of equally sized band portions the indexes of which are numeric and are arranged to increase sequentially with the frequency range covered by frequency bandwidth of the band portion that they represent.

(Supplementary note 4) The communication apparatus according to Supplementary note 2, wherein the plurality of non-overlapping band portions comprises a plurality of equally sized band portions the indexes of which are numeric and are arranged with the lowest indexes representing band portions at upper and lower frequency edges of the cell bandwidth, and with the indexes increasing towards the centre of the cell bandwidth.

(Supplementary note 5) The communication apparatus according to any one of Supplementary note 2 to 4, wherein the number of said plurality of band portions is defined using the formula:

$$NB = \left\lceil \frac{N_{RB}}{n} \right\rceil \quad \text{[Math. 63]}$$

where NB is the total number of said band portions (each equally sized band portion comprising a set of 'n' resource blocks); $N_{RB}$ is the total number of resource blocks in the cell bandwidth; and $$\lceil x \rceil \quad \text{[Math. 64]}$$

is a ceiling function (i.e. the smallest integer not less than 'x').

(Supplementary note 6) The communication apparatus according to Supplementary note 5, wherein the number of said equally sized band portions is defined using the formula:

$$NB_{whole} = \left\lfloor \frac{N_{RB}}{n} \right\rfloor \quad \text{[Math. 65]}$$

where $NB_{whole}$ is the number of said equally sized band portions each comprising a set of 'n' resource blocks; and $$\lfloor x \rfloor \quad \text{[Math. 66]}$$

is a flooring function (i.e. the largest integer not greater than 'x').

(Supplementary note 7) The communication apparatus according to any one of Supplementary notes 2 to 6, wherein when said obtained index is an index of one of said equally sized band portions, said controller is operable to generate said control data for uniquely identifying a position of said allocation of at least one resource block by jointly encoding said obtained index and said information for identifying an allocation to form jointly encoded control data.

(Supplementary note 8) The communication node according to Supplementary note 7, wherein said jointly encoded control data is derived using the following formula:

JESRIV=RIV+21*k where JESRIV is the jointly encoded control data; k is the obtained index; and RIV is the information for identifying an allocation and comprises a unique value representing an allocation of at least one resource block within band portion k.

(Supplementary note 9) The communication apparatus according to any one of Supplementary notes 2 to 8, wherein said plurality of band portions comprises at least one further band portion having fewer resource blocks than each of said equally sized band portions.

(Supplementary note) The communication apparatus according to Supplementary note 9, wherein said at least one further band portion is assigned a higher numeric index than said each of said equally sized band portions.

(Supplementary note 11) The communication apparatus according to Supplementary note 9 or 10 wherein said at least one further band portion is located: at an outside edge of said cell bandwidth; or at/near a centre portion of said cell bandwidth.

(Supplementary note 12) Communication apparatus for a communication system, wherein the communication apparatus comprises:
  a controller for operating a cell having a cell bandwidth;
  a transceiver for communicating, with a plurality of communication devices within said cell;
  wherein the controller is operable to:
    treat said cell bandwidth as a plurality of non-overlapping band portions, each band portion comprising a respective set of resource blocks that occupy a narrower frequency bandwidth than said cell bandwidth, and each band portion having a respective index for identifying that band portion; wherein the plurality of non-overlapping band portions comprises a plurality of equally sized band portions and at least one further band portion having fewer resource blocks than each of said equally sized band portions;
    obtain information for identifying an allocation of at least one resource block within the at least one further band portion for use by said at least one communication device; and
    generate, from said obtained information for identifying an allocation, control data for uniquely identifying a position of said allocation of at least one resource block, within said cell bandwidth; and
  wherein said transceiver is operable to signal said control data to said at least one communication device.

(Supplementary note 13) The communication apparatus according to any one of Supplementary notes 9 to 12, wherein said controller is operable to generate control data for uniquely identifying an allocation of at least one resource block within the at least one further band portion comprising a first value (k) and a second value (RIV) wherein said first value and said second value are related through a predefined mathematical relationship to a resource indication value (RIV') representing a starting resource block ($RB_{start}$) and a length ($L_{CRBs}$), in contiguously allocated resource blocks, of said allocation of at least one resource block within the at least one further band portion.

(Supplementary note 14) The communication apparatus according to Supplementary note 13, wherein said predefined mathematical relationship between said first value (k), said second value (RIV) and said resource indication value (RIV') is defined using the following formula:

RIV'=RIV−21+11k (Supplementary note 15) The communication apparatus according to any one of Supplementary notes 1 to 14, wherein said controller is configured to allocate resources in accordance with a hopping pattern in which the band portion used for communication with the at least one communication device changes following at least one frequency hop but the allocation of at least one resource block within that band portion used for said communication does not change.

(Supplementary note 16) The communication apparatus according to Supplementary note 15, wherein said controller is configured to allocate resources using the following scheme:

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s) \bmod 6) \quad \text{[Math. 67]}$$

wherein $\tilde{n}_{PRB}(n_s) = (\tilde{n}_{VRB} + 6 f_{hop}(i)) \bmod 6 N_{sb}$ wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said hopping pattern; $n_s$ is a slot number within a sub-frame; $f_{hop}(i)$ is the hopping pattern; SFN is a sub-frame number; $k_{first}$ is the lowest band portion index for which the hopping pattern is being applied; $N_{sb}$ is the number of consecutively numbered band portions, starting from $k_{first}$, for which the hopping pattern is being applied; $k_{VRB}$ is an index of a band portion in which the hopping pattern is being applied;

$$n_{PRB}^{SB}(k) \quad \text{[Math. 68]}$$

is the index, relative to the cell bandwidth, of a first resource block of band portion having index k; and $$\hat{n}_{VRB} \quad \text{[Math. 69]}$$

is the index, relative to a band portion, of an allocated resource block.

(Supplementary note 17) The communication apparatus according to any one of Supplementary notes 1 to 16, wherein said controller is configured to allocate resources in accordance with a mirroring pattern in at least some band portions, wherein the index of the band portion used for communication with the at least one communication device alternates between an index of a higher numerically indexed half of the at least some band portions and an index of a lower numerically indexed half of the at least some band portions.

(Supplementary note 18) The communication apparatus according to Supplementary note 17, wherein said controller is configured to allocate resources using the following scheme:

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s) \bmod 6) \quad \text{[Math. 70]}$$

wherein $$\tilde{n}_{PRB}(n_s) = \begin{cases} \tilde{n}_{VRB} & i \bmod 2 = 0 \\ 6\left(N_{sb} - 1 - \left\lfloor \frac{\tilde{n}_{VRB}}{6} \right\rfloor\right) + (\tilde{n}_{VRB} \bmod 6) & i \bmod 2 = 1 \end{cases}$$

wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said mirroring pattern; $n_s$ is a slot number within a sub-frame; SFN is a sub-frame number; $k_{first}$ is the lowest band portion index for which said mirroring pattern is being applied; $N_{sb}$ is the number of consecutively numbered band portions for which said mirroring pattern is being applied; $k_{VRB}$ is an index of a band portion in which said mirroring pattern is being applied;

$$n_{PRB}^{SB}(k) \quad \text{[Math. 71]}$$

is the index, relative to the cell bandwidth, of a first resource block of band portion having index k; and $$\hat{n}_{VRB} \quad \text{[Math. 72]}$$

is the index, relative to a band portion, of an allocated resource block.

(Supplementary note 19) The communication apparatus according to any one of Supplementary notes 1 to 18, comprising a base station of a long term evolution, LTE, radio access network.

(Supplementary note 20) A communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, the communication device comprising:
- a transceiver for receiving, from said communication apparatus, control data for uniquely identifying a position of an allocation of at least one resource block, within said cell bandwidth; and
- a controller for obtaining, from said received control data:
  i) an index of a band portion for use by said communication device; and ii) information for identifying an allocation of at least one resource block within that band portion for use by said communication device;
- wherein the transceiver is operable to communicate user data, via said communication apparatus, using said allocation of at least one resource block.

(Supplementary note 21) The communication device according to Supplementary note 20, wherein said control data comprises jointly encoded control data formed by jointly encoding said index and said information for identifying an allocation of at least one resource block.

(Supplementary note 22) The communication device according to Supplementary note 21, wherein said controller is operable to obtain, from jointly encoded control data, said information for identifying an allocation of at least one resource block using the following formula:

$$k = \left\lfloor \frac{JESRIV}{21} \right\rfloor \text{ and}$$
$$RIV = JESRIV \bmod 21$$
[Math. 73]

where JESRIV is the jointly encoded control data; k is the index of a band portion for use by said communication device; and RIV is the information for identifying an allocation and comprises a unique value representing an allocation of at least one resource block within band portion k.

(Supplementary note 23) The communication device according to any one of Supplementary notes 20 to 22, wherein said plurality of band portions comprises at least one further band portion having fewer resource blocks than each of said equally sized band portions.

(Supplementary note 24) A communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, wherein the plurality of non-overlapping band portions comprises a plurality of equally sized band portions and at least one further band portion having fewer resource blocks than each of said equally sized band portions, the communication device comprising:
- a transceiver for receiving, from said communication apparatus, control data for uniquely identifying a position of an allocation of at least one resource block, within said cell bandwidth; and
- a controller for obtaining, from said received control data, information for identifying said allocation of at least one resource block within the at least one further band portion for use by said at least one communication device;
- wherein the transceiver is operable to communicate user data, via said communication apparatus, using said allocation of at least one resource block.

(Supplementary note 25) The communication device according to Supplementary note 23 or 24, wherein said controller is operable to obtain, from said received control data, information uniquely identifying an allocation of at least one resource block within the at least one further band portion comprising a first value (k) and a second value (RIV) wherein said first value and said second value are related through a predefined mathematical relationship to a resource indication value (RIV) representing a starting resource block ($RB_{start}$) and a length ($L_{CRBs}$), in contiguously allocated resource blocks, of said allocation of at least one resource block within the at least one further band portion.

(Supplementary note 26) The communication device according to Supplementary note 25, wherein said predefined mathematical relationship between said first value (k), said second value (RIV) and said resource indication value (RIV') is defined as follows:

$$RIV'=RIV-21+11k$$

(Supplementary note 27) The communication device according to any one of Supplementary notes 20 to 26, wherein said controller is configured to determine allocated resources in accordance with a hopping pattern in which the band portion used for communication via the communication apparatus changes following at least one frequency hop but the allocation of at least one resource block within that band portion used for said communication does not change.

(Supplementary note 28) The communication device according to Supplementary note 27, wherein said controller is configured to determine allocated resources using the following scheme:

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s)\bmod 6)$$
[Math. 74]

wherein $\tilde{n}_{PRB}(n_s) = (\tilde{n}_{VRB} + 6f_{hop}(i)) \bmod 6N_{sb}$ wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said hopping pattern; $n_s$ is a slot number within a sub-frame; $f_{hop}(i)$ is the hopping pattern; SFN is a sub-frame number; $k_{first}$ is the lowest band portion index for which the hopping pattern is being applied; $N_{sb}$ is the number of consecutively numbered band portions, starting from $k_{first}$, for which the hopping pattern is being applied; $k_{VRB}$ is an index of a band portion in which the hopping pattern is being applied;

$$n_{PRB}^{SB}(k)$$
[Math. 75]

is the index, relative to the cell bandwidth, of a first resource block of band portion having index k; and $$\hat{n}_{VRB}$$
[Math. 76]

is the index, relative to a band portion, of an allocated resource block.

(Supplementary note 29) The communication device according to any one of Supplementary notes 20 to 28, wherein said controller is configured to determine allocated resources in accordance with a mirroring pattern in at least some band portions, wherein the index of the band portion used for communication via the communication apparatus alternates between an index of a higher numerically indexed half of the at least some band portions and an index of a lower numerically indexed half of the at least some band portions.

(Supplementary note 30) The communication device according to Supplementary note 29, wherein said controller is configured to determine allocated resources using the following scheme:

$$n_{PRB}(n_s) = n_{PRB}^{SB}\left(\left\lfloor\frac{\tilde{n}_{PRB}(n_s)}{6}\right\rfloor + k_{first}\right) + (\tilde{n}_{PRB}(n_s) \bmod 6)$$ [Math. 77]

wherein $\tilde{n}_{PRB}(n_s) =$ $$\begin{cases} \tilde{n}_{VRB} & i \bmod 2 = 0 \\ 6\left(N_{sb} - 1 - \left\lfloor\frac{\tilde{n}_{VRB}}{6}\right\rfloor\right) + (\tilde{n}_{VRB} \bmod 6) & i \bmod 2 = 1 \end{cases}$$

wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying said mirroring pattern; $n_s$ is a slot number within a sub-frame; SFN is a sub-frame number; $k_{first}$ is the lowest band portion index for which said mirroring pattern is being applied; $N_{sb}$ is the number of consecutively numbered band portions for which said mirroring pattern is being applied; $k_{VRB}$ is an index of a band portion in which said mirroring pattern is being applied;

$n_{PRB}^{SB}(k)$ [Math. 78]

is the index, relative to the cell bandwidth, of a first resource block of band portion having index k; and $\hat{n}_{VRB}$ [Math. 79]

is the index, relative to a band portion, of an allocated resource block.

(Supplementary note 31) The communication device according to any one of Supplementary notes 20 to 30, comprising a machine-type communication, 'MTC', device which is operable to communicate using a reduced bandwidth compared to the cell bandwidth.

(Supplementary note 32) A system comprising: the communication apparatus according to any one of Supplementary notes 1 to 19; and the communication device according to any one of Supplementary notes 20 to 31.

(Supplementary note 33) A method performed by communication apparatus operating a cell having a cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, and each band portion having a respective index for identifying that band portion, the method comprising:

obtaining: i) an index of a band portion for use by at least one communication device of said plurality of communication devices; and ii) information for identifying an allocation of at least one resource block within that band portion for use by said at least one communication device;

generating, from said obtained index and said information for identifying an allocation, control data for uniquely identifying a position of said allocation of at least one resource block, within said cell bandwidth; and signalling said control data to said at least one communication device.

(Supplementary note 34) A method performed by communication apparatus operating a cell having a cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion; wherein the plurality of non-overlapping band portions comprises a plurality of equally sized band portions and at least one further band portion having fewer resource blocks than each of said equally sized band portions, the method comprising:

obtaining information for identifying an allocation of at least one resource block within the at least one further band portion for use by said at least one communication device;

generating, from said obtained information for identifying an allocation, control data for uniquely identifying a position of said allocation of at least one resource block, within said cell bandwidth; and signalling said control data to said at least one communication device.

(Supplementary note 35) A method performed by a communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, the method comprising:

receiving, from said communication apparatus, control data for uniquely identifying a position of an allocation of at least one resource block, within said cell bandwidth;

obtaining, from said received control data: i) an index of a band portion for use by said communication device; and ii) information for identifying an allocation of at least one resource block within that band portion for use by said communication device; and communicating user data, via said communication apparatus, using said allocation of at least one resource block.

(Supplementary note 36) A method performed by a communication device for communicating within a cell operated by communication apparatus and having an associated cell bandwidth, wherein said cell bandwidth is treated as a plurality of non-overlapping band portions, each band portion comprising a respective set of resource blocks that occupy a narrower frequency bandwidth than said cell bandwidth, and each band portion having a respective index for identifying that band portion, wherein the plurality of non-overlapping band portions comprises a plurality of equally sized band portions and at least one further band portion having fewer resource blocks than each of said equally sized band portions, the method comprising:

receiving, from said communication apparatus, control data for uniquely identifying a position of an allocation of at least one resource block, within said cell bandwidth;

obtaining, from said received control data, information for identifying said allocation of at least one resource block within the at least one further band portion for use by said at least one communication device; and communicating user data, via said communication apparatus, using said allocation of at least one resource block.

(Supplementary note 37) A computer implementable instructions product comprising computer implementable instructions for causing a programmable communications device to perform the method of any one of Supplementary notes 33 to 36.

The invention claimed is:

1. Communication apparatus for a communication system, wherein the communication apparatus comprises:
   a transceiver configured to communicate with a plurality of communication devices;
   a controller configured to:
   determine: i) an index of a band portion for use by at least one communication device of the plurality of communication devices; and ii) information for identifying an allocation of at least one resource block within the band portion for use by the at least one communication device; and
   generate control data for uniquely identifying a position of the allocation of at least one resource block; and
   wherein the transceiver is configured to signal the control data to the at least one communication device,
   wherein the band portion comprises a set of resource blocks within a cell bandwidth,
   wherein the control data is generated based on the index and the information for identifying an allocation of at least one resource block,
   wherein the cell bandwidth comprises a plurality of equally sized band portions,
   wherein the band portion comprises at least one further band portion having fewer resource blocks than each of the equally sized band portions,
   wherein the at least one further band portion is located at or near a center portion of the cell bandwidth, and
   wherein the at least one further band portion is assigned a higher numeric index than the each of the equally sized band portions.

2. The communication apparatus according to claim 1, wherein the cell bandwidth comprises a plurality of equally sized band portions the indexes of which are numeric and are arranged with the lowest indexes representing band portions at upper and lower frequency edges of the cell bandwidth, and with the indexes increasing towards the centre of the cell bandwidth.

3. The communication apparatus according to claim 1, wherein the number of a plurality of band portion is defined using the formula:

$$NB = \left\lceil \frac{N_{RB}}{n} \right\rceil \quad \text{(Equation 1)}$$

where NB is the total number of the band portions (each equally sized band portion comprising a set of 'n' resource blocks); $N_{RB}$ is the total number of resource blocks in the cell bandwidth; and $$\lceil x \rceil \quad \text{(Equation 2)}$$

is a ceiling function (i.e. the smallest integer not less than 'x').

4. The communication apparatus according to claim 3, wherein the number of the equally sized band portions is defined using the formula:

$$NB_{whole} = \left\lfloor \frac{N_{RB}}{n} \right\rfloor \quad \text{(Equation 3)}$$

where $NB_{whole}$ is the number of the equally sized band portions each comprising a set of 'n' resource blocks; and $$\lfloor x \rfloor \quad \text{(Equation 4)}$$

is a flooring function (i.e. the largest integer not greater than 'x').

5. The communication apparatus according to claim 1, wherein when the determined index is an index of one of the equally sized band portions, the controller is further configured to generate the control data for uniquely identifying a position of the allocation of at least one resource block by jointly encoding the obtained index and the information for identifying an allocation to form jointly encoded control data.

6. The communication apparatus according to claim 5, wherein the jointly encoded control data is derived using the following formula:

JESRIV=RIV+21*k where JESRIV is the jointly encoded control data; k is the obtained index; and RIV is the information for identifying an allocation and comprises a unique value representing an allocation of at least one resource block within band portion k.

7. The communication apparatus according to claim 1, wherein the controller is further configured to generate control data for uniquely identifying an allocation of at least one resource block within the at least one further band portion comprising a first value (k) and a second value (RIV) wherein the first value and the second value are related through a predefined mathematical relationship to a resource indication value (RIV') representing a starting resource block start, ($RB_{start}$) and a length ($L_{CRBs}$), in contiguously allocated resource blocks, of the allocation of at least one resource block within the at least one further band portion.

8. The communication apparatus according to claim 7, wherein the predefined mathematical relationship between the first value (k), the second value (RIV) and the resource indication value (RIV') is defined using the following formula:

RIV'=RIV−21+11k.

9. The communication apparatus according to claim 1, wherein the controller is further configured to allocate resources in accordance with a hopping pattern in which the band portion used for communication with the at least one communication device changes following at least one frequency hop but the allocation of at least one resource block within that band portion used for the communication does not change.

10. The communication apparatus according to claim 9, wherein the controller is configured to allocate resources using the following scheme:

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s) \bmod 6) \quad \text{(Equation 5)}$$

wherein $\tilde{n}_{PRB}(n_s) = (\tilde{n}_{VRB} + 6f_{hop}(i)) \bmod 6N_{sb}$ wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying the hopping pattern; $n_s$ is a slot number within a sub-frame; $f_{hop}(i)$ is the hopping pattern; SFN is a sub-frame number; $k_{first}$ is the lowest band portion index for which the hopping pattern is being applied; $N_{sb}$ is the number of consecutively numbered band portions, starting from $k_{first}$, for which the hopping pattern is being applied; $k_{VRB}$ is an index of a band portion in which the hopping pattern is being applied;

$$n_{PRB}^{SB}(k) \quad \text{(Equation 6)}$$

is the index, relative to the cell bandwidth, of a first resource block of band portion having index k; and $$\hat{n}_{VRB} \quad \text{(Equation 7)}$$

is the index, relative to a band portion, of an allocated resource block.

11. The communication apparatus according to claim 1, wherein the controller is further configured to allocate resources in accordance with a mirroring pattern in at least some band portions, wherein the index of the band portion used for communication with the at least one communication device alternates between an index of a higher numerically indexed half of the at least some band portions and an index of a lower numerically indexed half of the at least some band portions.

12. The communication apparatus according to claim 11, wherein the controller is configured to allocate resources using the following scheme:

$$n_{PRB}(n_s) = n_{PRB}^{SB}\left(\left\lfloor \frac{\tilde{n}_{PRB}(n_s)}{6} \right\rfloor + k_{first}\right) + (\tilde{n}_{PRB}(n_s) \bmod 6)$$

wherein $$\tilde{n}_{PRB}(n_s) = \begin{cases} \tilde{n}_{VRB} & i \bmod 2 = 0 \\ 6\left(N_{sb} - 1 - \left\lfloor \frac{\tilde{n}_{VRB}}{6} \right\rfloor\right) + (\tilde{n}_{VRB} \bmod 6) & i \bmod 2 = 1 \end{cases}$$

wherein $\tilde{n}_{VRB} = 6(k_{VRB} - k_{first}) + \hat{n}_{VRB}$ and $i = SFN \bmod 10$ where $n_{PRB}(n_s)$ is an allocated resource after applying the mirroring pattern; $n_s$ is a slot number within a sub-frame; SFN is a sub-frame number; $k_{first}$ is the lowest band portion index for which the mirroring pattern is being applied; $N_{sb}$ is the number of consecutively numbered band portions for which the mirroring pattern is being applied; $k_{VRB}$ is an index of a band portion in which the mirroring pattern is being applied;

$$n_{PRB}^{SB} \quad \text{(Equation 9)}$$

is the index, relative to the cell bandwidth, of a first resource block of band portion having index k; and $$\hat{n}_{VRB} \quad \text{(Equation 10)}$$

is the index, relative to a band portion, of an allocated resource block.

13. The communication apparatus according to claim 1, comprising a base station of a long term evolution, LTE, radio access network.

14. A communication device for communicating with communication apparatus, the communication device comprising:
   a transceiver configured to receive, from the communication apparatus, control data for uniquely identifying a position of an allocation of at least one resource block; and
   a controller configured to obtain, from the received control data: i) an index of a band portion for use by the communication device; and ii) information for identifying an allocation of at least one resource block within that band portion for use by the communication device;
   wherein the transceiver is configured to communicate user data, via the communication apparatus, using the allocation of at least one resource block,
   wherein the band portion comprises a set of resource blocks within a cell bandwidth,
   wherein the band portion comprises at least one further band portion having fewer resource blocks than each of equally sized band portions,
   wherein the at least one further band portion is located at or near a center portion of the cell bandwidth, and
   wherein the at least one further band portion is assigned a higher numeric index than the each of the equally sized band portions.

15. The communication device according to claim 14, wherein the control data comprises jointly encoded control data formed by jointly encoding the index and the information for identifying an allocation of at least one resource block.

16. The communication device according to claim 15, wherein the controller is configured to obtain, from jointly encoded control data, the information for identifying an allocation of at least one resource block using the following formula:

(Equation 8)

$$k = \left\lfloor \frac{JESRIV}{21} \right\rfloor \text{ and} \quad \text{(Equation 11)}$$

$$RIV = JESRIV \bmod 21$$

where JESRIV is the jointly encoded control data; k is the index of a band portion for use by the communication device; and RIV is the information for identifying an allocation and comprises a unique value representing an allocation of at least one resource block within band portion k.

17. A method performed by communication apparatus for a communication system, wherein the method comprises:

communicating with a plurality of communication devices;

determining: i) an index of a band portion for use by at least one communication device of the plurality of communication devices; and ii) information for identifying an allocation of at least one resource block within the band portion for use by the at least one communication device;

generating control data for uniquely identifying a position of the allocation of at least one resource block; and signalling the control data to the at least one communication device, wherein the band portion comprises a set of resource blocks within a cell bandwidth, wherein the control data is generated based on the index and the information for identifying an allocation of at least one resource block, wherein the cell bandwidth comprises a plurality of equally sized band portions, wherein the band portion comprises at least one further band portion having fewer resource blocks than each of the equally sized band portions, wherein the at least one further band portion is located at or near a center portion of the cell bandwidth, and wherein the at least one further band portion is assigned a higher numeric index than the each of the equally sized band portions.

18. A method performed by a communication device for communicating with communication apparatus, the method comprising:

receiving, from the communication apparatus, control data for uniquely identifying a position of an allocation of at least one resource block;

obtaining, from the received control data: i) an index of a band portion for use by the communication device; and ii) information for identifying an allocation of at least one resource block within that band portion for use by the communication device; and communicating user data, via the communication apparatus, using the allocation of at least one resource block, wherein the band portion comprises a set of resource blocks within a cell bandwidth, wherein the band portion comprises at least one further band portion having fewer resource blocks than each of equally sized band portions, wherein the at least one further band portion is located at/near a centre portion of the cell bandwidth, wherein the at least one further band portion is assigned a higher numeric index than the each of the equally sized band portions.

* * * * *

UNITED STATES PATENT AND TRADEMARK OFFICE
CERTIFICATE OF CORRECTION

PATENT NO. : 10,667,255 B2
APPLICATION NO. : 15/748296
DATED : May 26, 2020
INVENTOR(S) : Yassin Aden Awad and Robert Arnott Page 1 of 1

It is certified that error appears in the above-identified patent and that said Letters Patent is hereby corrected as shown below:

In the Specification

Column 14, Overview, Lines 21-22 [Math. 25]; Delete "$N_R^{HO}$" and insert --$N_{RB}^{HO}$-- therefor Column 14, Overview, Lines 58-59; After "$k_{first}+N_{sb}\leq NB_{whole}$).", insert --[Math. 31]--

Column 15, Overview, Lines 12-13 [Math. 36]; Delete "$n_{PRB}^{SB}(k_{VRB})$" and insert --$n_{PRB}(n_s)=n_{PRB}^{SB}(k_{VRB})+\hat{n}_{VRB}$,-- therefor Column 16, Overview, Line 31 [Math. 48]; Delete "$N_{sb}$)," and insert --$N_{sb}$,-- therefor Column 19, Overview, Line 59; Delete "($L_{CRB}$)," and insert --($L_{CRBs}$),-- therefor In the Claims Column 30, Line 47; In Claim 7, after "block", delete "start,"

Column 31, Line 61; In Claim 12, delete "$n_{PRB}^{SB}$" and insert --$n_{PRB}^{SB}(k)$-- therefor Signed and Sealed this
Seventeenth Day of November, 2020

Andrei Iancu
*Director of the United States Patent and Trademark Office*